US012776317B2

(12) United States Patent
Cheng et al.

(10) Patent No.: US 12,776,317 B2
(45) Date of Patent: Oct. 27, 2026

(54) DIALOGUE STATE TRACKING FOR VOICE ASSISTANTS

(71) Applicant: Roku, Inc., San Jose, CA (US)

(72) Inventors: I-Tsun Cheng, San Jose, CA (US); Zei-Chan Yeh, Frisco, TX (US); Doo Soon Kim, San Jose, CA (US); Praful Chandra Mangalath, Sunnyvale, CA (US)

(73) Assignee: Roku, Inc., San Jose, CA (US)

( * ) Notice: Subject to any disclaimer, the term of this patent is extended or adjusted under 35 U.S.C. 154(b) by 209 days.

(21) Appl. No.: 18/678,283

(22) Filed: May 30, 2024

(65) Prior Publication Data

US 2025/0372090 A1 Dec. 4, 2025

(51) Int. Cl.

*G10L 15/26* (2006.01)
*G10L 15/18* (2013.01)
*G10L 15/22* (2006.01)

(52) U.S. Cl.

CPC .............. *G10L 15/22* (2013.01); *G10L 15/18* (2013.01)

(58) Field of Classification Search

None
See application file for complete search history.

(56) References Cited

U.S. PATENT DOCUMENTS 12,400,652 B1 * 8/2025 Fan ....................... G10L 15/183
2017/0228366 A1 * 8/2017 Bui ....................... G06F 40/247
2023/0135179 A1 * 5/2023 Mielke ................... G06N 5/022 704/232
2023/0230578 A1 * 7/2023 Sharifi ................... G10L 13/00 704/235
2024/0119932 A1 * 4/2024 Khorshid ................ G10L 15/22
2024/0282296 A1 * 8/2024 Bhathena ................ G06F 40/58
2025/0126155 A1 * 4/2025 Tiwari .................... G06F 40/56
2025/0252121 A1 * 8/2025 Sulser ................... G06F 16/322
2025/0252271 A1 * 8/2025 Weisz ..................... G06F 40/40
2025/0272506 A1 * 8/2025 Sassak, Jr. .............. G06F 40/40

(Continued)

OTHER PUBLICATIONS

Chen et al., "Stabilized In-Context Learning with Pre-trained Language Models for Few Shot Dialogue State Tracking," arXiv:2303.05932v1 [cs.CL] Feb. 12, 2023, 14 pages.

(Continued)

*Primary Examiner* — Neeraj Sharma
(74) *Attorney, Agent, or Firm* — Akona IP PC

(57) ABSTRACT

Dialogue state tracking for voice assistants involves correctly tracking intent and entities of a task that a user is performing. A dialogue state, having a tracked intent and one or more tracked entities, can then be used to perform the task. Building a dialogue state tracking system within a voice assistant is not trivial. In some embodiments, a dialogue state tracking system involving one or more large language models can be implemented downstream of a natural language understanding system to produce the tracked intent and the one or more tracked entities. In some embodiments, a dialogue state tracking system involving one or more large language models can be implemented upstream of a natural language understanding system to produce rephrased natural language text, which is in turn processed by the natural language understanding system to produce the tracked intent and the one or more tracked entities.

20 Claims, 15 Drawing Sheets

(56) References Cited

U.S. PATENT DOCUMENTS

| | | | | |
|---|---|---|---|---|
| 2025/0298839 | A1* | 9/2025 | Banerjee | G06F 16/51 |
| 2025/0298970 | A1* | 9/2025 | Khosla | G06F 40/20 |

OTHER PUBLICATIONS

Hu et al., "In-Context Learning for Few-Shot Dialogue State Tracking," arXiv:2203.08568v3 [cs.CL] Oct. 25, 2022, 17 pages.

Lee et al., "Effective and Efficient Conversation Retrieval for Dialogue State Tracking with Implicit Text Summaries," arXiv:2404.13043v3 [cs.CL] Apr. 2, 2024, 16 pages.

Wu et al., "TOD-BERT: Pre-trained Natural Language Understanding for Task-Oriented Dialogue," arXiv:2004.06871v3 [cs.CL] Oct. 1, 2020, 13 pages.

* cited by examiner

DIALOGUE STATE TRACKING FOR VOICE ASSISTANTS

TECHNICAL FIELD

This disclosure relates generally to voice assistants, and more specifically, improving dialogue state tracking in voice assistants.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Overview

Figure 1:
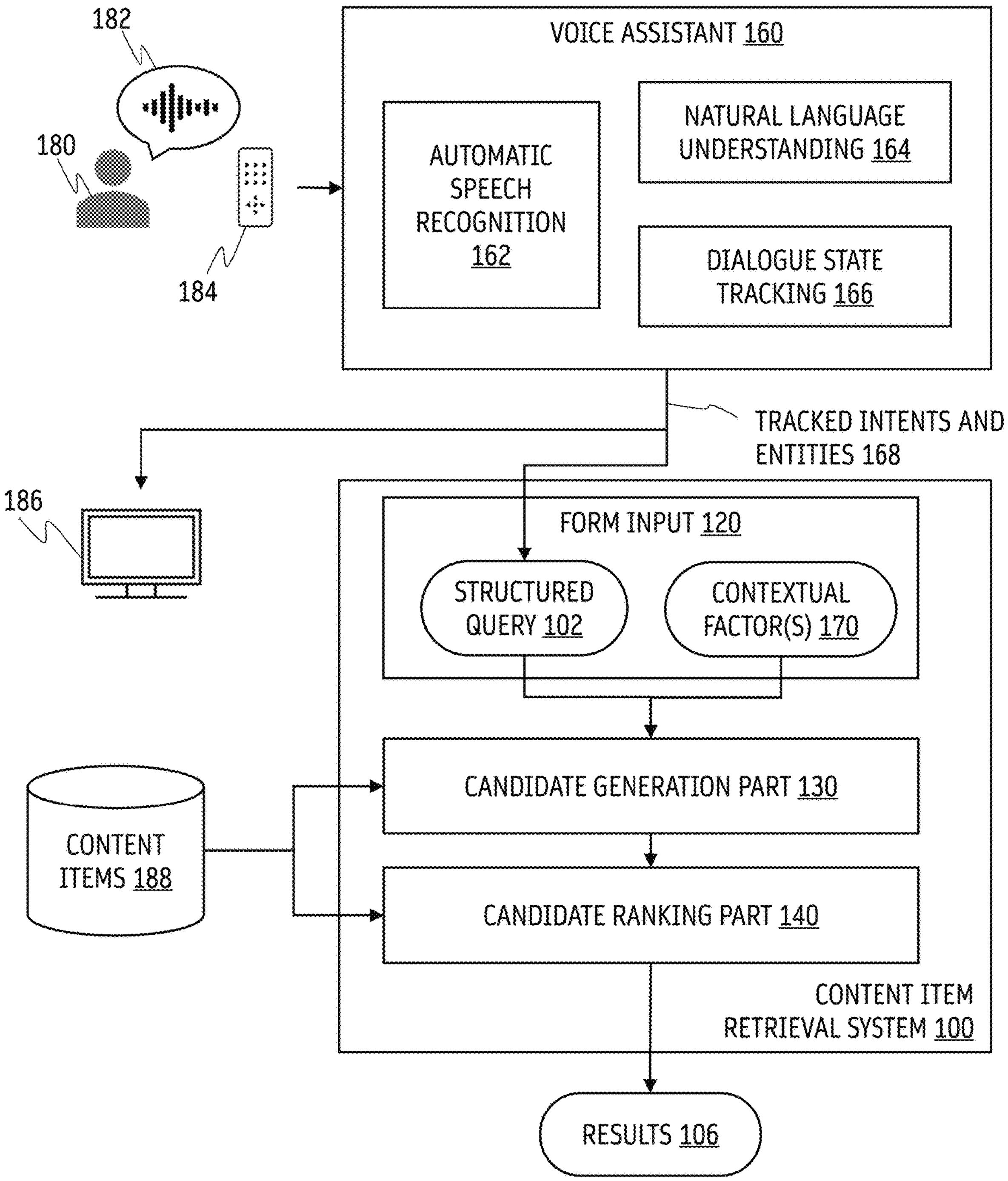
FIG. 1 illustrates a voice assistant and a content item retrieval system, according to some embodiments of the disclosure.

Voice assistants are implemented in consumer products and industrial applications to allow users to interact with a system using the users' voice. Voice assistants enable users to use voice commands to perform a task, such as to change a setting of a device, retrieve information, request content item(s), make a purchase, offer information, etc. Voice assistants may include components such as automatic speech recognition, natural language understanding, and dialogue state tracking.

Automatic speech recognition may use acoustic and language models to convert audio signals of user utterances into natural language text.

Natural language understanding may be implemented to extract intent and meaning behind a user's spoken words. Natural language understanding may include natural language processing functions such as intent classification, entity extraction, and content analysis. As used herein, an intent may specify a task classification, a type of task, or an identification of a specific task the user is trying to perform. An entity associated with the intent may specify a parameter for the task. An entity may have a value that is selected from a set of possible values for the parameter.

Dialogue state tracking for voice assistants implemented for systems such televisions or media players involves correctly maintaining a dialogue state, e.g., having tracking intent and entities of a task that a user is performing. In many scenarios, a user may be performing a task through a conversation, a dialogue, or a sequence of user utterances. A sequence of user utterances may represent refinements of a task. In some cases, a user utterance in a sequence of user utterances may refine one or more previous user utterances. In some cases, a user utterance in a sequence of user utterances may ask a clarification question or make a clarification about one or more previous user utterances. In some cases, a user utterance in a sequence of user utterances may confirm an intent and/or one or more entities associated with one or more previous user utterances. In some cases, a user utterance in a sequence of user utterances may be a start of a new task. Dialogue state tracking may identify whether a current user utterance is a refinement of an existing task, or whether a current user utterance is a start of a new task. A dialogue state, having a tracked intent and one or more tracked entities, can then be used to perform the task, such as searching for content items using a content item retrieval system.

A start of a new task may be referred to as a shift or change in topic. The technical task of determining whether a user utterance is a refinement of the task being performed by one or more previous user utterances or not, or determining whether a user utterance is a start of a new task or not, may be referred to as topic shift detection.

When tracking dialogue state for content item retrieval in particular, dialogue state tracking aims to determine whether the intent has changed in the current user utterance and if the intent has not changed, whether one or more tracked entities are to be updated based on the current user utterance. The tracked intent and tracked entities can be used to form a structured query to retrieve relevant content items for the user using a content item retrieval system. For example, dialogue state tracking can determine whether the current user utterance is a refinement of the content item retrieval task, or a start of a new task. If the current user utterance is a refinement of the content item retrieval task, then one or more tracked entities of the dialogue state are to be updated based on the current user utterance, which may include adding one or more entities in the current user utterance to the one or more tracked entities. If the current user utterance is a start of a new task, then the tracked intent and the one or more tracked entities are to reflect the intent and one or more entities of the current user utterance only.

In one example, a user may make a first utterance, "action movies". Dialogue state tracking may track the intent and one or more entities of the first utterance (e.g., tracked intent=video.request, tracked entities=genre:action, type: movies). The user may subsequently make a second utterance, "with Beau Chastain". Dialogue state tracking may determine that the second utterance is a refinement of the task associated with the first utterance. Dialogue state tracking may track the intent and one or more entities of the dialogue state associated with the first utterance and the second utterance. Dialogue state tracking may determine that the intent of the second utterance is the same as the tracked intent. Dialogue state tracking may determine that the entity of the second utterance is to be added to the tracked entities of the dialogue state (e.g., tracked intent=video.request, tracked entities=genre:action, type: movies, actor:Beau Chastain).

In one example, a user may make a first utterance, "action movies". Dialogue state tracking may track the intent and one or more entities of the first utterance (e.g., tracked intent=video.request, tracked entities=genre:action, type: movies). The user may subsequently make a second utterance, "comedies instead". Dialogue state tracking may determine that the second utterance is a refinement of the task associated with the first utterance. Dialogue state tracking may track the intent and one or more entities of the dialogue state associated with the first utterance and the second utterance. Dialogue state tracking may determine that the intent of the second utterance is the same as the tracked intent, e.g., the intent remains as video.request. Dialogue state tracking may determine that the entity of the second utterance replaces or modifies the tracked entities of the dialogue state (e.g., tracked intent=video.request, tracked entities=genre:comedy, type:movies). Specifically, the tracked entity, "genre" having "action" may be replaced by "comedy". The tracked entity, "type" having "movies" remains the same.

In one example, a user may make a first utterance, "I want to watch an Enigma Protocol movie". Dialogue state tracking may track the intent and one or more entities of the first utterance (e.g., tracked intent=video.request, tracked entities=franchise:Enigma Protocol, type:movies). The user may subsequently make a second utterance, "show me free ones". Dialogue state tracking may determine that the second utterance is a refinement of the task associated with the first utterance. Dialogue state tracking may track the intent and one or more entities of the dialogue state associated with the first utterance and the second utterance. Dialogue state tracking may determine that the intent of the second utterance is the same as the tracked intent. Dialogue state tracking may determine that the entity of the second utterance is to be added to the tracked entities of the dialogue state (e.g., tracked intent=video.request, tracked entities=franchise:Enigma Protocol, type:movies, cost:free).

In one example, a user may make a first utterance, "show me a courtroom drama TV show". Dialogue state tracking may track the intent and one or more entities of the first utterance (e.g., tracked intent=video.request, tracked entities=genre:courtroom drama, type:TV series). The user may subsequently make a second utterance, "new sci-fi movies". Dialogue state tracking may determine that the second utterance is not a refinement of the task associated with the first utterance. Dialogue state tracking may determine that the second utterance is a start of a new task. Dialogue state tracking may track the intent and one or more entities of the dialogue state associated with the second utterance only and treats the intent and entities of the second utterance separately from the first utterance. Dialogue state tracking may clear the dialogue state, and use the intent and one or more entities of the second utterance as the tracked intent and one or more tracked entities of the dialogue state (e.g., tracked intent=video.request, tracked entities=genre: sci-fi, type:movies, new_release:yes).

In one example, a user may make a first utterance, "show me a horror film". Dialogue state tracking may track the intent and one or more entities of the first utterance (e.g., tracked intent=video.request, tracked entities=genre:horror, type:movie). The user may subsequently make a second utterance, "turn down the volume a little bit please". Dialogue state tracking may determine that the second utterance is not a refinement of the task associated with the first utterance. Dialogue state tracking may determine that the second utterance is a start of a new task. Dialogue state tracking may track the intent and one or more entities of the dialogue state associated with the second utterance only, and treats the intent and entities of the second utterance separately from the first utterance. Dialogue state tracking may clear the dialogue state, and use the intent and one or more entities of the second utterance as the tracked intent and one or more tracked entities of the dialogue state (e.g., tracked intent=device_volume:decrease, tracked entities=amount: 1).

Dialogue state tracking allows a user to engage with a voice assistant using multiple utterances as opposed to including all the information for a task in a single utterance or single turn. The capability allows users to use the voice assistant more easily and in a more natural manner. Building a dialogue state tracking system within a voice assistant to efficiently and effectively track intent and entities and identify the start of a new task is not trivial. Some natural language understanding systems use large language models to correctly understand natural language text and extract intent and entities. However, it is not evident how large language models can be used efficiently and effectively within a voice assistant to perform dialogue state tracking. It can be a challenge to apply a general large language model to a specific domain such as content item retrieval. Some approaches include fine-tuning a general large language model to the specific domain, but high performance may require a significant amount of domain-specific training data (e.g., a large, labeled dataset). Fine-tuning a general large language model can be costly and time-consuming.

To address some of these concerns, dialogue state tracking can implement one or more (general) large language models that can perform dialogue state tracking without fine-tuning. With properly generated prompts, one or more large language models trained on vast amounts of text can pick up linguistic cues to classify whether a current user utterance is a refinement of an existing task or not. In response to the generated prompt, the large language model can reason correctly and output a dialogue state. Depending on the implementation and location of the large language model in the voice assistant, the dialogue state may include tracked intent and one or more tracked entities, or the dialogue state may include rephrased natural language text that captures the current task. The large language model may reside in a loop where historical information about the dialogue state may be maintained and used in the generated prompt.

A prompt generator can be implemented to generate the prompts. A generated prompt can include one or more of: an instruction template, one or more (relevant) examples, and output format.

The instruction template may include an explanation of a role. The instruction template may include an explanation of a task for the large language model. The instruction template may include step-by-step instructions or a set of operations to encourage the large language model to reason correctly.

The one or more examples may include example input and example output, which may provide in-context learning for the large language model. In-context learning using the one or more examples enables the large language model to adapt to the task for tracking dialogue for performing content item retrieval tasks using examples in the prompt and without the need for explicit fine-tuning or training. The one or more examples may be retrieved based on contextual information, such as contextual factors and semantic features. Tailored, relevant examples may improve the adaptability of the large language model to the context.

The output format may include formatting requirements of the output of the large language model. The output format enables the output of the large language model to be used easily by downstream systems.

In some embodiments, a dialogue state tracking system involving one or more large language models can be implemented downstream of a natural language understanding system to produce the tracked intent and the one or more tracked entities. The natural language understanding system may first extract intent and one or more entities of user utterances, then the dialogue state tracking system performs dialogue state tracking to maintain a dialogue state. The dialogue state tracking system may generate a prompt that has a current dialogue state and one or more past dialogue states. The current dialogue state may include natural language text produced by an automatic speech recognition system (e.g., based on audio of a current user utterance). The current dialogue state may include an intent and one or more entities associated with the intent. The intent and the one or more entities may be extracted by the natural language understanding system from the natural language text. A past dialogue state may include a past natural language text (e.g., based on past audio of a past user utterance). The past dialogue state may include a past intent and one or more past entities associated with the past intent. The past intent and the one or more past entities may be extracted by the natural language understanding system from the past natural language text. The one or more past dialogue states may provide information about one or more past user utterances. The prompt may further include an instruction template and one or more examples.

In some embodiments, a dialogue state tracking system involving one or more large language models can be implemented upstream of a natural language understanding system to produce rephrased natural language text that represents the dialogue state in natural language form, which is in turn processed by the natural language understanding system to produce the dialogue state having the tracked intent and the one or more tracked entities. A classifier prompt generator may generate a classifier prompt, which includes a first natural language text representing a first user utterance (e.g., a current user utterance), and a past natural language text representing one or more past user utterances belong to a task. The past natural language text preferably embodies information from the one or more past user utterances (rather than having an appended, compilation, or list of the natural language text of each past user utterance). The past natural language text may include rephrased natural language text that is produced by the dialogue state tracking system. The classifier prompt may further include a classifier instruction template and one or more classifier examples. A classifier large language model may receive the classifier prompt and generate a classifier result in response to receiving the classifier prompt. The classifier result may indicate whether the first natural language text builds upon or is a refinement of the task associated with the past natural language text. A rephraser prompt generator may generate a rephraser prompt, which includes the first natural language text and a past text input. In some embodiments, the rephraser prompt generator is instructed to combine the first natural language text and the past text input. In some embodiments, the rephraser prompt generator is instructed to rephrase the language in the first natural language text and the past text input in a way that would simplify the language or make the language easier for natural language understanding to parse or comprehend. The past text input may be the past natural language text if the classifier result indicates that the first natural language text builds upon the task associated with the past natural language text. The past text input may be NULL (e.g., empty) if the classifier result indicates that the first natural language text does not build upon the task associated with the past natural language text or starts a new task that is different from the task. The rephraser prompt may include a rephraser instruction template and one or more rephraser examples. A rephraser large language model may receive the rephraser prompt and generate the rephrased natural language text. The rephrased natural language text result can combine the first natural language text and the past text input. The rephraser large language model can not only produce rephrased natural language text that encompasses information from the first natural language text and the past text input, the rephraser large language model can form the rephrased natural language text in a manner that makes the rephrased natural language text easier to process by the natural language understanding system when compared to natural language text that is directly taken from the automatic speech recognition system. For example, the rephrased natural language text may include specific keywords, use a more straightforward set of vocabulary, and/or use consistent language syntax.

In some embodiments, the dialogue state tracking system that is implemented before the natural language understanding system may further include a resolver prompt generator and a resolver large language model. The resolver prompt generator may generate a resolver prompt, which includes a second natural language text, e.g., produced by an automatic speech recognition system, a resolver instruction template, and one or more resolver examples. The resolver large language model can generate the first natural language text (provided as input to the classifier prompt generator) in response to the resolver prompt. The resolver large language model can answer internal questions in the second natural language text and insert answers into the first natural language text. As a result, the downstream classifier large language model, the downstream rephraser large language model, and the downstream natural language understanding system can generate results more easily and effectively, even when the natural language text of a user utterance is complicated and may not have resolved answers. The resolver large language model can help the downstream components perform better and more robustly.

Voice Assistants Used for Content Item Retrieval

FIG. 1 illustrates voice assistant 160 and content item retrieval system 100, according to some embodiments of the disclosure. User 180 may interact with a digital content platform, via voice assistant 160, to retrieve content items to consume using content item output system 186 such as a television, a smart speaker, or a media player. A digital content platform may allow users to access and view thousands to millions or more content items. Content items may include media content, such as audio content, video content, image content, augmented reality content, virtual reality content, mixed reality content, gaming content, textual content, interactive content, etc. Examples of content items may include books, audio books, music, movies, television series, mini-series, advertisements, short films, films, documentaries, podcasts, audio clips, radio programming, games, interactive content, immersive content, etc. Users may routinely interact with a digital content platform by performing searches using content item retrieval system 100. A search may be executed using structured query 102 and optionally one or more contextual factors 170. Content item retrieval system 100 may produce results 106, and a content item output system may output results 106 to the user.

User 180 may want to search or retrieve content item(s) using the user's voice. User 180 may make an utterance 182. An audio capturing device, such as a microphone in a remote control 184, may produce an audio signal in response to utterance 182 being made by user 180. The audio signal may be provided or transmitted to voice assistant 160.

Voice assistant 160 may include automatic speech recognition system 162. Automatic speech recognition system 162 may include an acoustic model and a language model. Automatic speech recognition system 162 can turn the audio signal into natural language text. The acoustic model may map audio features extracted from the audio signal into phonetic representations. Exemplary acoustic models may include Gaussian Mixture Models, Deep Neural Networks, and Hidden Markov Models. The acoustic model may account for variability in speech due to accents, speaking rates, background noise, etc. The language model may estimate probabilities of sequences of words or phrases based on the output of the acoustic model. Exemplary language models may include N-gram models, neural network language models, and maximum entropy models. Automatic speech recognition system 162 may receive the audio signal, process the audio signal, and produce natural language text representing words uttered by user 180.

When user 180 is wanting to search for or retrieve content items or is wanting to interact with content item output system 186, user 180 may utter different sentences or phrases, such as:

"war movies"
"not rated-R"
"laugh out loud comedies"
"sit coms". "show me funny office comedies with romance"
"TV series with strong female characters". "I want to watch 1980s romantic movies with a happy ending"
"short animated films"
"ones that talks about family values"
"I don't want to pay"
"show me free ones only"
"it needs to have Tanner Becket"
"I want to watch something that won an award last year"
"surprise me with blockbuster movies from 1990s that involves a tragedy". "What is that movie where there is a Samoan warrior and a girl going on a sea adventure?"
"with a female director"
"critically-acclaimed dramas right now"
"I want to see a film set in Tuscany but is not dubbed in English"
"Recommend me movies of Payton Castillo"
"free for me to watch"
"put on subtitles"
"turn it up"
"show French subtitles". "play the second one"
"fast forward 1 minute"
"turn off in 15 minutes". "I love this show!"

Voice assistant 160 may include natural language understanding 164. Natural language understanding 164 may receive natural language text, process the natural language text, and produce an intent and optionally one or more entities associated with the intent. In some embodiments, natural language understanding 164 may include one or more artificial intelligence models to interpret the natural language text and produce structured representation of the natural language text. The structured representation may include an intent and optionally one or more entities associated with the intent. Natural language understanding 164 may in some cases be able to leverage prior knowledge about human language to extract nuances and resolve ambiguity in the natural language text when producing the structured representation.

Figure 3:
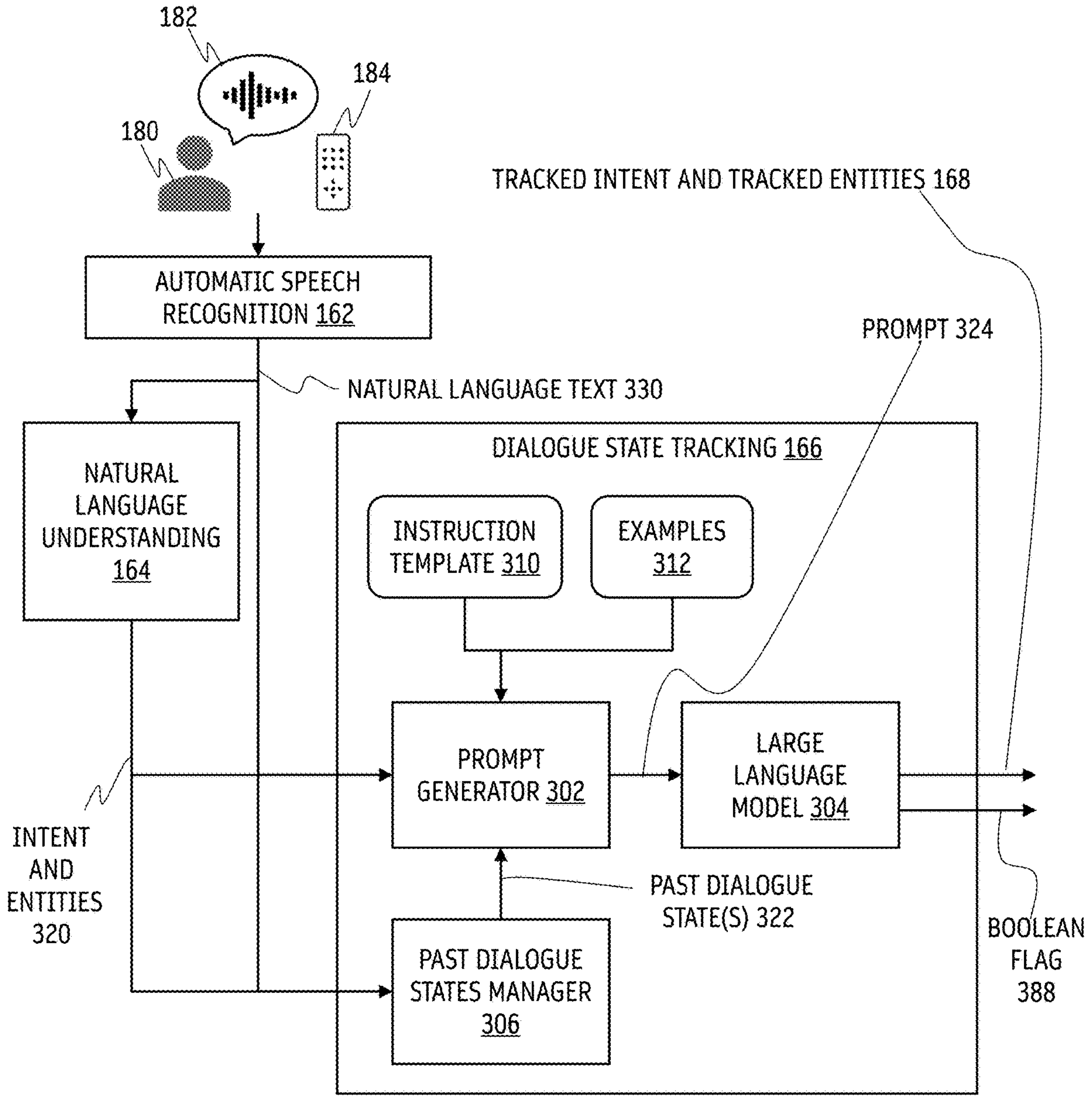
FIG. 3 illustrates dialogue state tracking downstream of natural language understanding, according to some embodiments of the disclosure.
Figure 6:
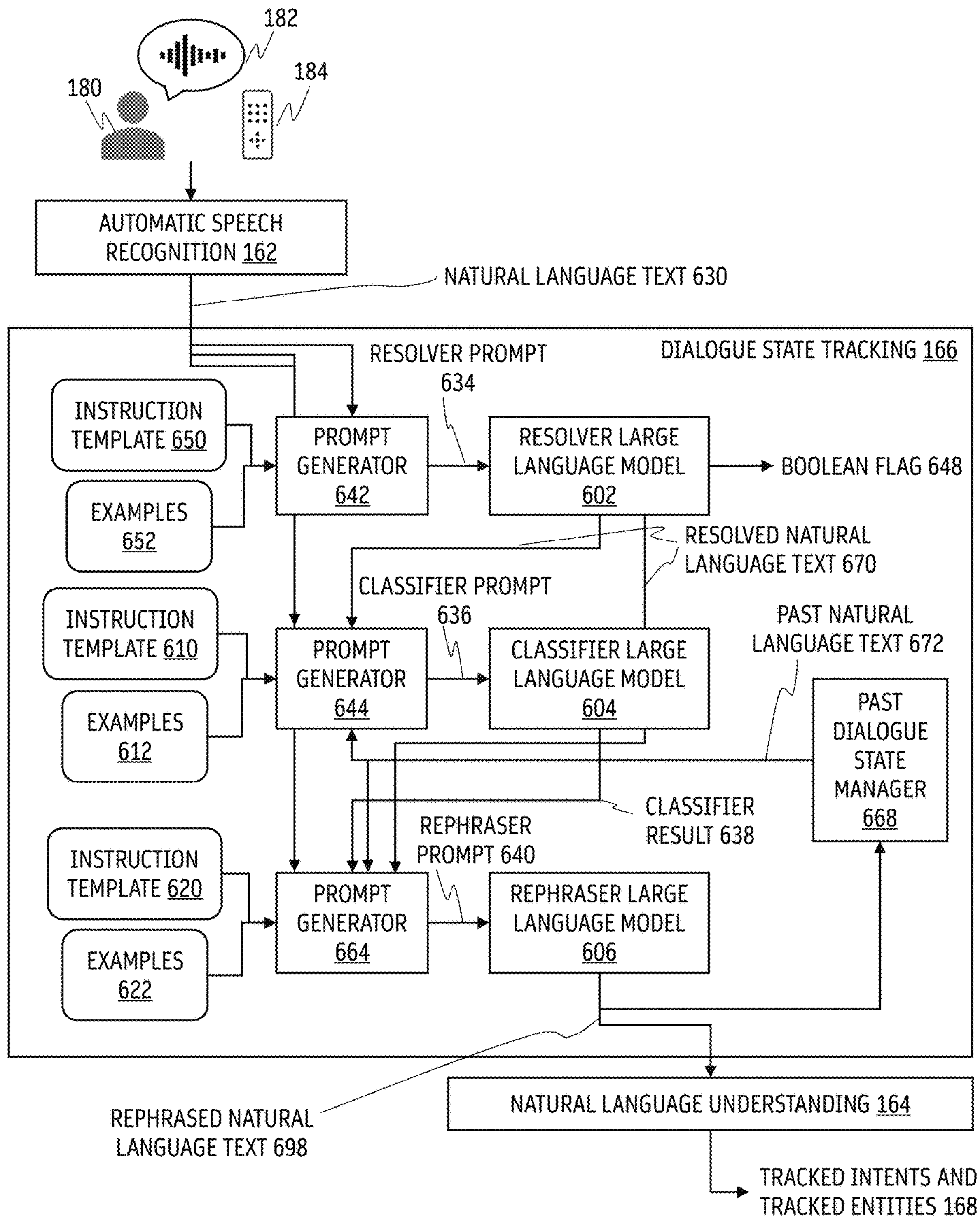
FIG. 6 illustrates dialogue state tracking upstream of natural language understanding, according to some embodiments of the disclosure.

It is not uncommon for user 180 to make one or more utterances to perform a task. Dialogue state tracking 166 can monitor the dialogue state for content item retrieval. Voice assistant 160 may include dialogue state tracking 166. Dialogue state tracking 166 can produce a current dialogue state for user 180. The dialogue state may include a tracked intent and one or more tracked entities. An exemplary implementation dialogue state tracking 166 that produces the tracked intent and the one or more tracked entities is illustrated in FIG. 3. The dialogue state may include rephrased natural language text that captures the current dialogue state. An exemplary implementation dialogue state tracking 166 that produces rephrased natural language text is illustrated in FIG. 6.

In some embodiments, dialogue state tracking 166 can determine whether there has been a change in the tracked intent and optionally change in one or more entities with a current utterance. If the intent remains the same, dialogue state tracking 166 may check whether any tracked entities need updating in view of the current utterance. For instance, dialogue state tracking helps identify whether the current user utterance refines an existing content item retrieval task or initiates a new one. If the user's input refines an existing task, we update the tracked entities accordingly (which may involve adding new entities from the current utterance). On the other hand, if it's the start of a new task, the tracked intent and entities should reflect only the intent and entities from the current user utterance.

In some embodiments, dialogue state tracking 166 can determine whether the current utterance is a refinement of the task being performed by user 180 or a start of a new task. If the current utterance is a refinement, dialogue state tracking 166 may combine a past rephrased natural language text representing the task so far with natural language text of the current utterance to produce a rephrased natural language text as the current dialogue state. If the current utterance is not a refinement, but instead is a start of a new task, dialogue state tracking 166 may output the natural language text of the current utterance as the rephrased natural language text that represents the current dialogue state. Natural language understanding 164 can process the rephrased natural language text to extract the tracked intent and one or more tracked entities that represent the current dialogue state.

Voice assistant 160 finally outputs tracked intents and entities 168, which can include the tracked intent and the one or more tracked entities produced by dialogue state tracking 166 or by dialogue state tracking 166 and natural language understanding 164. In some embodiments, tracked intents and entities 168 can be used to form a command that can cause an action or operation to be executed by the content item output system 186. In some embodiments, tracked intents and entities 168 can be provided to content item retrieval system 100, e.g., when the tracked intent corresponds to content item retrieval. Content item retrieval system 100 may include form input 120 to create structured query 102 for retrieving relevant content items based on tracked intents and entities 168. Structured query 102 may include a string or a data structure expressing a search request or search parameters which can be used by candidate generation part 130 to find content items in content items 188. Structured query 102 may include one or more predefined fields and one or more operators arranged according to specific syntax rules. Structured query 102 may specify one or more desired search criteria, and the search criteria may be determined by form input 120 based on the one or more tracked entities in entities 168. In some cases, form input 120 may retrieve or determine one or more contextual factors 170, which may be used in retrieving content items which are relevant to one or more contextual factors 170. Examples of contextual factors 170 can include: characteristic(s) about the user making the query, time of day, day of the week, time of the year, seasonality (e.g., seasons, special events, holidays, etc.), one or more past queries made by the user, one or more past user interactivity information with the content platform (e.g., what the user clicked on, what the user has watched, etc.), whether the query is voice-based or text-based, the type of device that the user is using (e.g., mobile device versus television), the type of application that the user is using, whether the user is a paid subscriber or not, what subscriptions the user has, demographics about the user, whether the user is an expert/experienced user or not, whether the user is a loyal user or not, how many retrieved content items the user is looking for, characteristic(s) about the device the user is using to input the natural language query, the amount of bandwidth the user has on a network to receive content, the user's position in a social graph/network, the user's relationships with other users in a social graph/network, etc. The input formed by form input 120 having structured query 102 and optionally one or more contextual factors 170 may capture context of a particular search session with a user. The input formed by form input 120 may capture information that may be helpful for understanding what a user is looking for and/or what may be relevant or useful to the user. In some cases, form input 120 may transform structured query 102 and optionally one or more contextual factors 170 into a feature vector to represent information in structured query 102 and optionally one or more contextual factors 170 in a (latent) feature space.

Content item retrieval system 100 may include several operations to produce results 106. Content item retrieval system 100 may include one or more of: candidate generation part 130, and candidate ranking part 140.

Candidate generation part 130 may search in content items 188 to determine relevant candidates to structured query 102 and optionally one or more contextual factors 170. The structured query 102 and optionally one or more contextual factors 170 (or the feature vector generated therefrom) may be provided to candidate generation part 130 to find semantically and/or contextually relevant candidates, e.g., content items in content items 188 that are semantically and/or contextually relevant to structured query 102 and optionally one or more contextual factors 170. Candidate generation part 130 may use one or more models to identify a set of relevant candidates, e.g., content items relevant to structured query 102 and optionally one or more contextual factors 170. Examples of models may include keyword matching, vector space model, probabilistic model, etc. One or more models may be used to score the candidates in content items 188 and determine relevance scores. Top K highest relevance scoring candidates may be returned as the set of relevant candidates. Relevant candidates may be provided to candidate ranking part 140 for ranking.

Candidate ranking part 140 may rank the set of relevant candidates produced by candidate generation part 130. Candidate ranking part 140 may determine and output ranked candidates. Candidate ranking part 140 may determine a ranking score for each relevant candidate found by candidate generation part 130 and sort the relevant candidates based on the ranking scores to produce ranked relevant candidates. In some cases, candidate ranking part 140 may rank content items based on structured query 102 and optionally one or more contextual factors 170 (or the feature vector generated therefrom). Information based on structured query 102 and optionally one or more contextual factors 170 may be provided to candidate ranking part 140 to augment ranking of relevant candidates, e.g., content items relevant to structured query 102 and optionally one or more contextual factors 170.

Content item retrieval system 100 may return results 106 having ranked relevant candidates, e.g., content items relevant to structured query 102 and optionally one or more contextual factors 170. Results 106 may be returned to user 180 who made an utterance 182. Results 106 may be output (e.g., rendered for display) to user 180. Results 106 may be output to the user according to the ranking determined in candidate ranking part 140. In some cases, results 106 may be accentuated (e.g., enlarged) based on signaling from in candidate ranking part 140.

Figure 2:
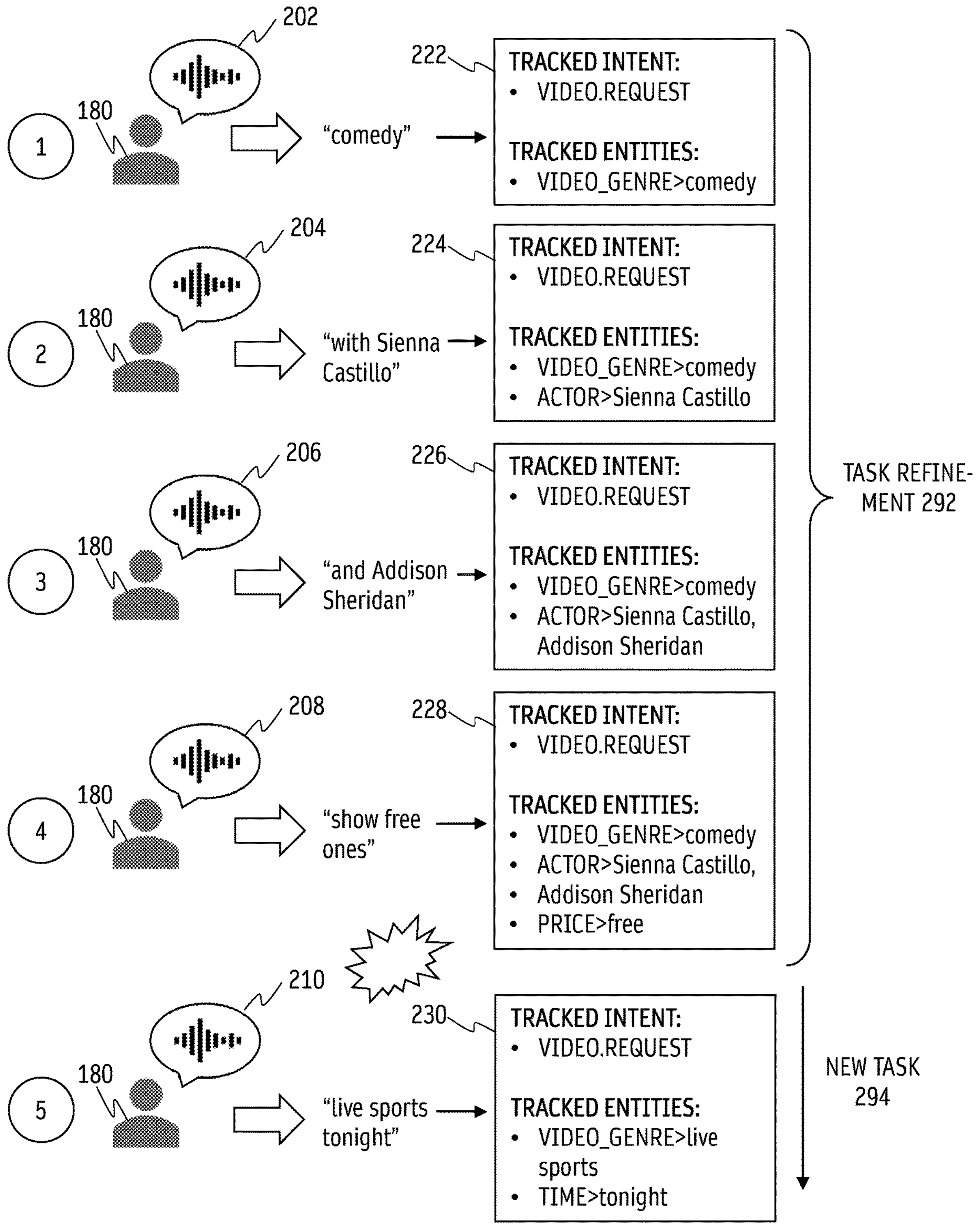
FIG. 2 illustrates user utterances, according to some embodiments of the disclosure.

Exemplary User Utterances Reflecting a Refinement of a Content Item Retrieval Task or a Start of a New Content Item Retrieval Task FIG. 2 illustrates user utterances, according to some embodiments of the disclosure. User 180 may make a series of utterances, one after another. The utterances may be associated with one or more content item retrieval tasks that user 180 may wish to perform. An utterance may refine a task. An utterance may be a start of a new task. User 180 may make an utterance, and an automatic speech recognition system (e.g., automatic speech recognition system 162) may output natural language text. A voice assistant with dialogue state tracking (e.g., voice assistant 160 with natural language understanding 164 and dialogue state tracking 166) can process the natural language text and historical information about the dialogue state to determine whether there is a task refinement or continuation of a task, and to determine a current and updated dialogue state. The voice assistant can output a tracked intent and one or more tracked entities as the current and updated dialogue state. The current and updated dialogue state can be used to execute the task the user 180 is wishing to perform. For example, the tracked intent and one or more tracked entities may be used as input to a content item retrieval system (e.g., content item retrieval system 100).

User 180 may make a first utterance 202, and "comedy" may be generated by the automatic speech recognition system. The voice assistant with dialogue state tracking may determine dialogue state 222 with tracked intent: video.request, and tracked entities: VIDEO_GENRE>comedy.

User 180 may make a second utterance 204, and "with Sienna Castillo" may be generated by the automatic speech recognition system. The voice assistant with dialogue state tracking may determine dialogue state 224 with tracked intent: video.request, and tracked entities: VIDEO_GENRE>comedy, ACTOR>Sienna Castillo. The voice assistant with dialogue state tracking may determine that the second utterance 204 is part of task refinement 292.

User 180 may make a third utterance 206, and "and Addison Sheridan" may be generated by the automatic speech recognition system. The voice assistant with dialogue state tracking may determine dialogue state 226 with tracked intent: video.request, and tracked entities: VIDEO_GENRE>comedy, ACTOR>Sienna Castillo, Addison Sheridan. The voice assistant with dialogue state tracking may determine that the third utterance 206 is part of task refinement 292.

User 180 may make a fourth utterance 208, and "show free ones" may be generated by the automatic speech recognition system. The voice assistant with dialogue state tracking may determine dialogue state 228 with tracked intent: video.request, and tracked entities: VIDEO_GENRE>comedy, ACTOR>Sienna Castillo, Addison Sheridan, PRICE>free. The voice assistant with dialogue state tracking may determine that the fourth utterance 208 is part of task refinement 292.

User 180 may make a fifth utterance 210, and "live sports tonight" may be generated by the automatic speech recognition system. The voice assistant with dialogue state tracking may determine dialogue state 230 with tracked intent: video.request, and tracked entities: VIDEO_GENRE>live sports, TIME>tonight. The voice assistant with dialogue state tracking may determine that the fifth utterance 210 is not part of task refinement 292, but a start of a new task 294.

Large Language Models

Various embodiments of the dialogue state tracking system described herein involve one or more large language models. A large language model is a type of artificial intelligence system that uses deep learning techniques, specifically transformers and self-attention mechanisms, to process and generate human-like text based on patterns learned from vast amounts of training data. A large language model has a transformer-based architecture. The transformer is one of the building blocks of a large language model. The transformer is a type of neural network that uses self-attention mechanisms to capture long-range dependencies in sequential data, such as text. The transformer architecture includes an encoder and a decoder, both having multiple (multi-head) attention layers and feed-forward neural network layers.

A large language model may include embeddings layer, an encoder, a decoder, and output layer. Embeddings layer converts the input text into numerical vector representations called embeddings. These embeddings represent the semantic and syntactic properties of words, allowing the large language model to understand the meaning and context of the input. Since the transformer architecture does not have an inherent notion of word order, positional encodings can be added to the input embeddings to provide the model with information about the position of each word in the sequence. The encoder processes the input sequence and creates a context-aware representation. The encoder includes multiple attention layers and feed-forward neural network layers. The decoder takes the encoded input representation from the encoder and generates the output sequence, token by token. The decoder can autoregressively generate output tokens one by one, attending to the encoded input and the previous output. The decoder includes multiple attention layers and feed-forward neural network layers. The output layer takes the representations from the decoder and can output probability distributions over the vocabulary for the next token in the sequence.

The attention layers allow the model to weigh different parts of the input sequence when producing the output. The attention mechanism enables the model to focus on the most relevant parts of the input for a given task, such as generating a coherent and contextually appropriate response. Multi-head attention is a technique that allows the large language model to attend to different representations of the input simultaneously. Multi-head attention may include several attention heads, each of which learns to attend to different aspects of the input, improving the model's ability to capture complex relationships and patterns.

Feed-forward neural network layers apply non-linear transformations to the output of the attention layers, allowing the model to learn more complex representations of the input data.

The input text, or a sequence of input tokens, received and processed by a large language model is referred to as a prompt. A prompt may include a sequence of words and characters. The words and characters may be converted by the large language model into a sequence of tokens.

Implementing Dialogue State Tracking Downstream of Natural Language Understanding FIG. 3 illustrates dialogue state tracking downstream of natural language understanding, according to some embodiments of the disclosure. Dialogue state tracking 166 may be downstream of natural language understanding 164. Dialogue state tracking 166 may include one or more of: prompt generator 302, large language model 304, and past dialogue states manager 306.

When used downstream of natural language understanding 164, dialogue state tracking 166 may manage dialogue state in the form of intents and entities. In addition, dialogue state tracking 166 may manage dialogue state using the natural language text from which the intents and entities were extracted.

Automatic speech recognition system 162 may receive an audio signal produced by an audio capturing system (e.g., remote control 184) in response to user 180 making utterance 182. Automatic speech recognition system 162 may process the audio signal to produce natural language text 330. Natural language understanding 164 may process natural language text 330 to produce intent and entities 320.

Prompt generator 302 may receive a current dialogue state. The current dialogue state may include natural language text 330 produced by automatic speech recognition system 162. Natural language text 330 may be generated by automatic speech recognition system 162 from an audio signal capturing a current (or latest) utterance of user 180. The current dialogue state may include an intent, and one or more entities associated with the intent in intent and entities 320 from natural language understanding 164. The intent and the one or more entities, shown as intent and entities 320, are extracted by natural language understanding 164 from the natural language text 330. In one example, a current dialogue state may include:

| | Example |
|---|---|
| Natural language text 330 | "and Addison Sheridan" |
| Intent in intent and entities 320 | video.request |
| One or more entities in intent and entities 320 | ACTOR > Addison Sheridan |

Prompt generator 302 may receive one or more past dialogue states 322 from past dialogue states manager 306. A past dialogue state of the one or more past dialogue states can include a past natural language text. The past natural language text may be natural language text generated by automatic speech recognition system 162 for a past utterance (an utterance prior to the current utterance made by user 180). The past dialogue state may include a past intent, and one or more past entities associated with the past intent. The past intent and the one or more past entities may be extracted by the natural language understanding 164 from the past natural language text. In one example, one or more past dialogue state may include:

| | | Example |
|---|---|---|
| A first past | Past natural language text | "comedy" |
| dialogue state | Past intent | video.request |
| | One or more past entities | VIDEO_GENRE > comedy |
| A second past | Past natural language text | "with Sienna Castillo" |
| | Past intent | video.request |
| dialogue state | One or more past entities | ACTOR > Sienna Castillo |

Prompt generator 302 may generate prompt 324. Prompt 324 may include the current dialogue state (having intent and entities 320 and natural language text 330), the one or more past dialogue states 322, an instruction template 310, and one or more examples 312. A detailed example of prompt 324 is described and illustrated in FIG. 4.

Prompt 324 may be input into large language model 304. Large language model 304 may receive and process prompt 324. In response to prompt 324, large language model 304 may generate a tracked entity and one or more tracked entities in response to prompt 324, shown as tracked intent and tracked entities 168. Tracked intent and tracked entities 168 may represent or reflect the intent and entities of an updated dialogue state that takes the current dialogue state into account. If the current dialogue state builds upon the one or more past dialogue states, the updated dialogue state would combine the current dialogue state and the one or more past dialogue states. If the current dialogue state does not build upon the one or more past dialogue states, the updated dialogue state would include the current dialogue state only. Tracked intent and tracked entities 168 may be received by a system downstream, e.g., a content item retrieval system 100 of FIG. 1 to perform the task intended by user 180. In one example, the tracked intent and tracked entities 168 may include:

| | Example |
|---|---|
| Tracked intent in intent and entities 168 | video.request |
| One or more tracked entities in intent and entities 168 | VIDEO_GENRE > comedy<br>ACTOR > Sienna Castillo, Addison Sheridan |

In some embodiments, the tracked intent and one or more tracked entities 168 may be translated into a search query. The search query may be provided as input into a content item retrieval system (e.g., content item retrieval system 100 of FIG. 1). One or more results produced by the content item retrieval system in response to the search query can be output to user 180.

In some embodiments, in response to prompt 324, large language model 304 may generate a Boolean flag 388, which may indicate whether the current dialogue state builds upon (or is a task refinement) the one or more past dialogue states, or whether the current dialogue state represents a start of a new task. In one example, Boolean flag 388=Y to indicate that the current dialogue state builds upon the one or more past dialogue states, and Boolean flag 388=N to indicate that the current dialogue state does not build upon the one or more past dialogue states. In one example, Boolean flag 388=1 to indicate that the current dialogue state builds upon the one or more past dialogue states, and Boolean flag 388=0 to indicate that the current dialogue state does not build upon the one or more past dialogue states. In one example, Boolean flag 388=Y to indicate that the current dialogue state is a start of a new task, and Boolean flag 388=N to indicate that the current dialogue state is a refinement of an existing task. In one example, Boolean flag 388=1 to indicate that the current dialogue state is a start of a new task, and Boolean flag 388=0 to indicate that the current dialogue state is a refinement of an existing task.

Past dialogue states manager 306 may be included in dialogue state tracking 166 to maintain historical information about one or more past utterances made by user 180. The historical information may be included in prompt 324 so that large language model 304 can determine whether the current dialogue state builds upon (or is a task refinement) the historical information or not. In some embodiments, past dialogue states manager 306 may store natural language text 330 and entities 320 as an entry in past dialogue states manager 306. In some embodiments, past dialogue states manager 306 may receive Boolean flag 388 from large language model 304 indicating whether natural language text 330 and intent and entities 320 represent a start of a new task. Past dialogue states manager 306 may clear any (previous) entries in past dialogue states manager 306 prior to the (latest) entry, in response to Boolean flag 388 indicating that natural language text 330 and intent and entities 320 is the start of the new task. Clearing the previous entries help to maintain only historical information in past dialogue states manager 306 that reflects the new task, and one or more past dialogue states 322 would include only the historical information that reflects the new task. In some embodiments, past dialogue states manager 306 may store up to a maximum number of entries. Even if the Boolean flag 388 indicates that natural language text 330 and intent and entities 320 is not start of a new task, past dialogue states manager 306 may clear the earliest entry in past dialogue states manager 306 when the number of entries in past dialogue states manager 306 has exceed the maximum number of entries. Examples of maximum number of entries may be 5, 6, 7, 8, and 10.

In some cases, the maximum number of entries may be configurable or adjustable. For instance, the maximum number of entries may be user configurable. A user may indicate that the user would like for the voice assistant to accommodate longer dialogue with many user utterances and adjust the maximum number of entries to be higher than a default number. In some cases, the maximum number of entries may depend on the use case or context in which the voice assistant is used. If the voice assistant is being used to complete a complex task where many user utterances may be used to refine the complex task, the maximum number of entries may be set higher than a default number. If the voice assistant is being used to complete a simple task where only one or two user utterances may be expected to complete the simple task, the maximum number of entries may be set lower than the default number. In some cases, the maximum number of entries may depend on the user, such as a conversational style or preference of the user. If the user prefers or tends to have long dialogue with many user utterances with the voice assistant, the maximum number of entries may be set higher than a default number. If the user prefers or tends to have short dialogue with few user utterances with the voice assistant, the maximum number of entries may be set lower than a default number.

Figure 4:
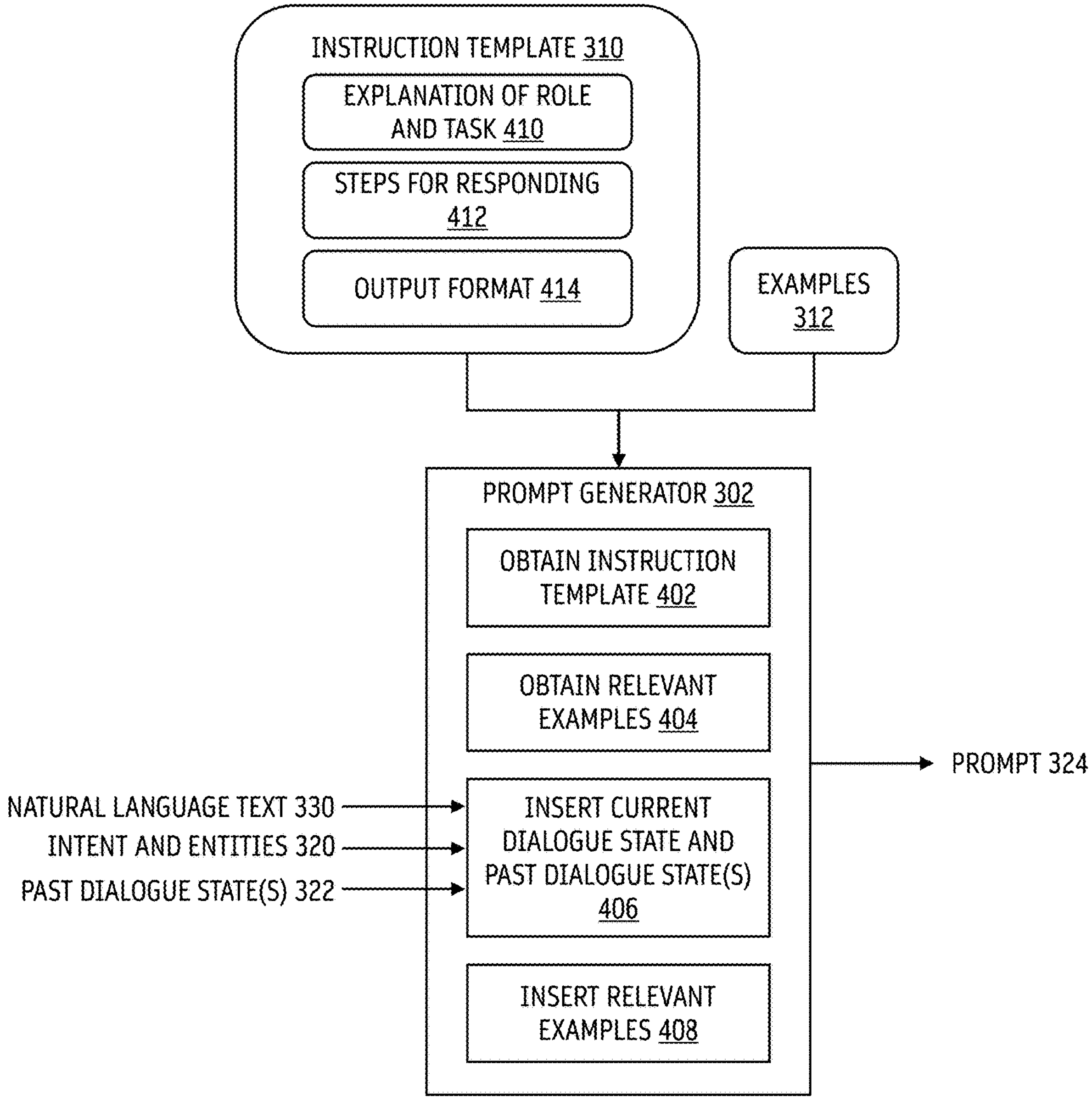
FIG. 4 illustrates a prompt generator, according to some embodiments of the disclosure.

FIG. 4 illustrates prompt generator 302, according to some embodiments of the disclosure. Prompt generator 302 may include obtain instruction template 402, obtain relevant examples 404, insert current dialogue state and one or more past dialogue states 406, and insert relevant examples 408. Prompt generator 302 may generate prompt 324.

Obtain instruction template 402 may retrieve instruction template 310. Instruction template 310 may include explanation of role and task 410, steps for responding 412 to prompt 324, and output format 414. Steps for responding 412 to prompt 324 may include: (1) summarizing the current dialogue state, (2) summarizing the one or more past dialogue states, and (3) determining whether a summary of the current dialogue state is a refinement of the summary of the one or more past dialogue states. In some embodiments, steps for responding 412 to prompt 324 can include (4) in response to determining that the summary of the current dialogue state is not the refinement of the summary of the one or more past dialogue states, outputting the intent and the one or more entities in the current dialogue state as the tracked intent and the one or more tracked entities. In some embodiments, steps for responding 412 to prompt 324 can include (5) in response to determining that the summary of the current dialogue state is the refinement of the summary of the one or more past dialogue states, updating the tracked intent and the one or more tracked entities based on the intent and the one or more entities in the current dialogue state and the past intent and the one or more past entities in the past dialogue state, and outputting the tracked intent and the one or more tracked entities.

The following is an example of the instruction template 310:

| | Example |
|---|---|
| Explanation of role and task 410 | You are a dialogue state tracker to help users search for content on TV. User will provide the queries said so far as well as the predicted entities for each query, turn-by-turn.<br>Your task is to provide the dialogue state at the last turn of the conversation. The state here refers to updated entities. |
| Steps for responding 412 | Use the steps below to respond:<br>1. First, determine if the last query builds upon the previous queries. To do this, first summarize what the user wants in the previous queries. Then, summarize what the user wants in the last query. Classify if the user continues from the previous query, or wants to watch a separate content different from before.<br>2. Then, provide the dialogue state of the last query based on the classification result from Step 1. If the last query builds upon the previous queries, then the previous dialogue states should be updated with the entities of the last query to form the updated dialogue state. If last query does not build upon previous queries, then the dialogue state should only contain entities of the last query. |
| Output format 414 | Here is the output format:<br>""""<br>Builds Upon: <result from Step 1, either "Y" or "N"><br>Dialogue State: <dialogue state of last query, in JSON format><br>"""" |

Obtain relevant examples 404 may retrieve one or more examples 312. In some embodiments, the one or more examples 312 may be predetermined or preselected for prompt 324. The one or more examples 312 may include one or more example inputs to large language model 304 and one or more example outputs of large language model 304 corresponding to or expected for the one or more example inputs. An example input may include a current dialogue state (having natural language text 330 and intent and entities 320) and one or more past dialogue states 322. An example output may include tracked intent and tracked entities 168 and optionally the Boolean flag 388. The following is an example of the one or more examples 312:

| Examples of one or more example inputs of one or more examples 312 | Examples of one or more example outputs of one or more examples 312 |
|---|---|
| Query: "action movie"<br>Entities: {"video_genre": ["action"], "video_content_type": ["movie"]} | Builds Upon: N<br>Dialogue State: {"video_genre": ["action"], "video_content_type": ["movie"]} |
| Query: "action movie"<br>Entities: {"video_genre": ["action"], "video_content_type": ["movie"]}<br>Query: "with Chante Bousso"<br>Entities: {"actor": ["Chante Bousso"]} | Builds Upon: Y<br>Dialogue State: {"video_genre": ["action"], "video_content_type": ["movie"], "actor": ["Chante Bousso"]} |
| Query: "action movie"<br>Entities: {"video_genre": ["action"], "video_content_type": ["movie"]}<br>Query: "with Chante Bousso"<br>Entities: {"actor": ["Chante Bousso"]}<br>Query: "and Deja Montoya"<br>Entities: {"actor": ["Deja Montoya"]} | Builds Upon: Y<br>Dialogue State: {"video_genre": ["action"], "video_content_type": ["movie"], "actor": ["Chante Bousso", "Deja Montoya"]} |
| Query: "action movie"<br>Entities: {"video_genre": ["action"], "video_content_type": ["movie"]}<br>Query: "with Chante Bousso"<br>Entities: {"actor": ["Chante Bousso"]}<br>Query: "and Deja Montoya"<br>Entities: {"actor": ["Deja Montoya"]}<br>Query: "romance movies"<br>Entities: {"video_genre": ["romance"], "video_content_type": ["movies"]} | Builds Upon: N<br>Dialogue State: {"video_genre": ["romance"], "video_content_type": ["movies"]} |

For simplicity, intent is omitted from the one or more examples 312. It is envisioned that the intent may be included in the one or more example inputs and the tracked intent may be included in the dialogue state in the one or more example outputs.

Insert current dialogue state and one or more past dialogue states 406 may append or add a current dialogue state (having natural language text 330 and intent and entities 320) and one or more past dialogue states 322 into a suitable location in instruction template 310 obtained by obtain instruction template 402.

Insert relevant examples 408 may append or insert one or more examples 312 obtained in obtain relevant examples 404 into a suitable location in instruction template 310 obtained by obtain instruction template 402.

To improve performance of in-context learning of large language model 304 or increase adaptability of large language model 304, obtain relevant examples 404 may obtain one or more examples 312 based on additional information. Obtain relevant examples 404 may determine one or more contextual factors associated with one or more of a user, a user device, and time. Obtain relevant examples 404 may retrieve the one or more examples 312 using the one or more contextual factors. Such examples may help large language model 304 formulate outputs more accurately for the user, the user device, and time. Obtain relevant examples 404 may determine one or more semantic features associated with one or more of: the current dialogue state (having natural language text 330 and intent and entities 320) and the one or more past dialogue states 322. Obtain relevant examples 404 may retrieve the one or more examples 312 using the one or more semantic features. Such examples may help large language model 304 formulate outputs more accurately for the current dialogue state and the one or more past dialogue states 322.

Figure 5:
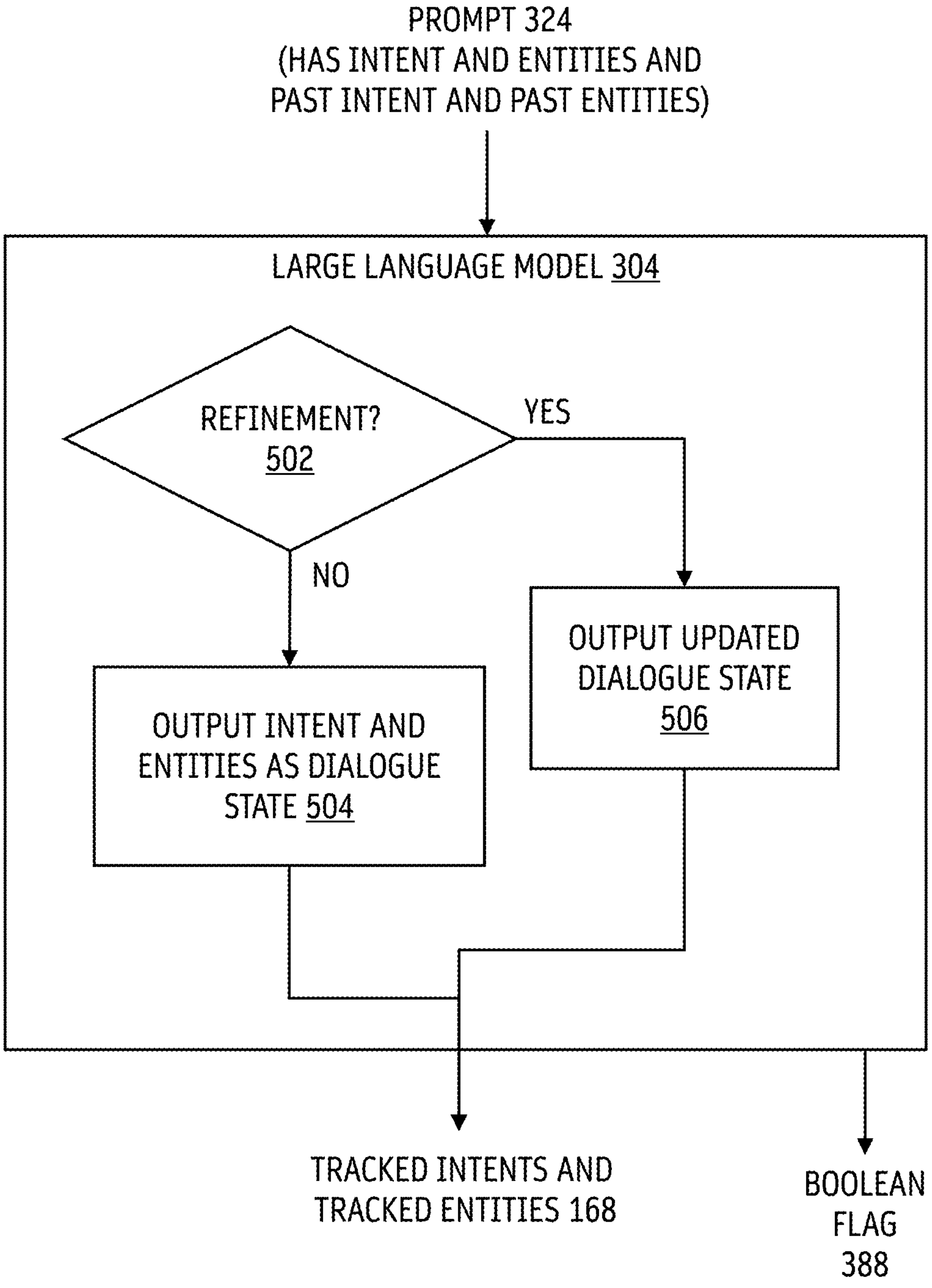
FIG. 5 illustrates hidden functionalities of a large language model, according to some embodiments of the disclosure.

FIG. 5 illustrates hidden functionalities of large language model 304, according to some embodiments of the disclosure. Large language model 304 may receive prompt 324, and generate tracked intents and tracked entities 168 and optionally Boolean flag 388. Large language model 304 has many components which may cooperate with each other to transform prompt 324 into tracked intents and tracked entities 168 and optionally Boolean flag 388. The components, when used to process prompt 324, may produce tracked intents and tracked entities 168 and optionally Boolean flag 388 as if these hidden functionalities were performed.

In 502, components of large language model 304 may determine whether the current dialogue state is a refinement of an existing task. If YES, the process proceeds to 506. If NO, the process proceeds to 504. The result of 502 may be used by components of large language model 304 to output Boolean flag 388.

In 504, components of large language model 304 may output intents and entities of the current dialogue state (e.g., intent and entities 320 of FIG. 3) as the dialogue state. Large language model 304 may output intents and entities of the current dialogue state as tracked intents and tracked entities 168.

In 506, components of large language model 304 may update the dialogue state based on the intents and entities of the current dialogue state (e.g., intent and entities 320 of FIG. 3) and at least a past intent and one or more past entities of a past dialogue state. The updated dialogue state may combine the current dialogue state with one or more past dialogue states. Large language model 304 may output the updated dialogue state as tracked intents and tracked entities 168.

Implementing Dialogue State Tracking Upstream of Natural Language Understanding

FIG. 6 illustrates dialogue state tracking upstream of natural language understanding, according to some embodiments of the disclosure. Dialogue state tracking 166 may be upstream of natural language understanding 164. Dialogue state tracking 166 may include prompt generator 642, resolver large language model 602, prompt generator 644, classifier large language model 604, prompt generator 664, rephraser large language model 606, and past dialogue state manager 668. In some embodiments, prompt generator 642 and resolver large language model 602 are optional.

When used upstream of natural language understanding 164, the dialogue state is maintained and generated by dialogue state tracking 166 in the form of natural language text (only). The dialogue state generated by dialogue state tracking 166 does not include tracked intents and entities. The dialogue state having natural language text representing the updated dialogue state may be processed by natural language understanding 164 downstream to produce tracked intents and tracked entities 168. Dialogue state tracking 166 may produce rephrased natural language text 698.

Automatic speech recognition system 162 may receive an audio signal produced by an audio capturing system (e.g., remote control 184) in response to user 180 making utterance 182. Automatic speech recognition system 162 may process the audio signal to produce natural language text 630.

Natural language understanding 164 may process rephrased natural language text 698 to produce tracked intents and tracked entities 168. The tracked intent and one or more tracked entities 168 may be translated into a search query. The search query may be provided as input into a content item retrieval system (e.g., content item retrieval system 100 of FIG. 1). One or more results produced by the content item retrieval system in response to the search query can be output to user 180.

Prompt generator 642 (a resolver prompt generator), if included, may receive natural language text 630, a resolver instruction template 650, and one or more resolver examples 652. Prompt generator 642 may generate resolver prompt 634. Resolver prompt 634 may include natural language text 630, a resolver instruction template 650, and one or more resolver examples 652. A detailed example of resolver prompt 634 is described and illustrated in FIG. 7. Resolver large language model 602 may receive resolver prompt 634. Resolver large language model 602 may generate resolved natural language text 670 in response to resolver prompt 634. Resolver large language model 602 may resolve ambiguities and/or internal questions in natural language text 630. For example, natural language text 630 may include "show movies with the same director as Fractured Sanity", and resolver large language model 602 may generate resolved natural language text 670 having "show movies with Kyle Navarro as the director". A detailed illustration of the hidden functionalities of resolver large language model 602 is described in FIG. 8.

In some embodiments, in response to resolver prompt 634, resolver large language model 602 may generate a Boolean flag 648 indicating whether natural language text 630 has an internal question. In one example, Boolean flag 648=Y or 1 to indicate that natural language text 630 has an internal question, and Boolean flag 648=N or 0 to indicate that natural language text 630 does not an internal question.

Prompt generator 644 may receive natural language text 630 or resolved natural language text 670 that represents utterance 182 made by user 180. Prompt generator 644 may receive, from past dialogue state manager 668, past natural language text 672 that represents one or more past user utterances belonging to a task (e.g., latest dialogue state). Prompt generator 644 may generate classifier prompt 636. Classifier prompt 636 may include natural language text 630 or resolved natural language text 670, past natural language text 672, a classifier instruction template 610, and one or more classifier examples 612. A detailed example of classifier prompt 636 is described and illustrated in FIG. 9. Classifier large language model 604 may receive classifier prompt 636. Classifier large language model 604 may generate a classifier result 638 in response to classifier prompt 636. Classifier large language model 604 may determine whether natural language text 630 or resolved natural language text 670 is a refinement of an existing task or a start of a new task. Classifier result 638 may indicate whether natural language text 630 or resolved natural language text 670 builds upon the task associated with past natural language text 672 (retrieved from past dialogue state manager 668). For example, natural language text 630 or resolved natural language text 670 may include "show those that are free", and past natural language text 672 may include "action movies with Aisha Badiaga", and the classifier result 638 may include "Y" to indicate that natural language text 630 or resolved natural language text 670 builds upon past natural language text 672. In another example, natural language text 630 or resolved natural language text 670 may include "sci-fi TV shows", and past natural language text 672 may include "action movies with Aisha Badiaga", and the classifier result 638 may include "N" to indicate that natural language text 630 or resolved natural language text 670 does not build upon past natural language text 672. A detailed illustration of the hidden functionalities of classifier large language model 604 is described in FIG. 10.

Prompt generator 664 may receive natural language text 630 or resolved natural language text 670 that represents utterance 182 made by user 180. Prompt generator 664 may receive, from past dialogue state manager 668, past natural language text 672 that represents one or more past user utterances belonging to a task (e.g., latest dialogue state). Prompt generator 664 may receive classifier result 638. Prompt generator 664 may generate rephraser prompt 640. Rephraser prompt 640 may include natural language text 630 or resolved natural language text 670, a past text input (e.g., past natural language text 672 or NULL), a rephraser instruction template 620, and one or more rephraser examples 622. A detailed example of rephraser prompt 640 is described and illustrated in FIG. 11. Rephraser large language model 606 may receive rephraser prompt 640. Rephraser large language model 606 may generate a rephrased natural language text 698 in response to rephraser prompt 640. Rephraser large language model 606 may combine natural language text 630 or resolved natural language text 670 with the past text input to produce the rephrased natural language text 698. Additionally, rephraser large language model 606 can generate rephrased natural language text 698 to use a more suitable syntax and/or predetermined keywords to make a cleaner input to natural language understanding 164. For example, natural language text 630 or resolved natural language text 670 may include "show those that are free", past natural language text 672 may include "action movies with Aisha Badiaga", and the classifier result 638 may include "Y". The past text input may include "action movies with Aisha Badiaga" and the resolved natural language text 670 may include "show free action movies with Aisha Badiaga". In another example, natural language text 630 or resolved natural language text

670 may include "sci-fi TV shows", the past natural language text 672 may include "action movies with Aisha Badiaga", and the classifier result 638 may include "N". The past text input may include NULL, and the resolved natural language text 670 may include "sci-fi TV shows". A detailed illustration of the hidden functionalities of rephraser large language model 606 is described in FIG. 12.

Rephrased natural language text 698 may combine natural language text 630 or resolved natural language text 670 and the past text input (e.g., past natural language text 672 or NULL). Natural language understanding 164 may receive rephrased natural language text 698 that rephraser large language model 606 generated in response to rephraser prompt 640.

Past dialogue state manager 668 may maintain dialogue state. Rephraser large language model 606 may output rephrased natural language text 698, which presents the dialogue state up to the current utterance 182. Past dialogue state manager 668/may store rephrased natural language text 698 as historical information about the current dialogue state. The latest rephrased natural language text 698 stored in past dialogue state manager 668 may be output by past dialogue state manager 668 as the past natural language text 672 used by prompt generator 644 and prompt generator 664.

The system design and implementation illustrated by FIG. 6 has a variety of advantages. Dialogue state tracking 166 operates and maintains dialogue state in natural language space or domain. Rephraser large language model 606 does not need to generate an output that has structured data such as intents and entities (whereas large language model 304 of FIG. 3 generates structured data having tracked intents and tracked entities 168). Large language models in dialogue state tracking 166 of FIG. 6 can be very effective at processing natural language and can perform better when working with natural language only (e.g., when compared against large language models in dialogue state tracking 166 of FIG. 3). Dialogue state tracking 166 of FIG. 6 has at least two or three large language models to perform specific tasks such as resolving, classifying, and rephrasing. The system is modularized, and when the large language models can perform focused tasks, their predictions can be more accurate. In addition, dialogue state tracking 166 of FIG. 6 treats natural language understanding 164 as a separate component and is not reliant on the robustness of natural language understanding 164 since dialogue state tracking 166 is upstream from natural language understanding 164. Moreover, dialogue state tracking 166 of FIG. 6 pre-processes and cleans up the input to natural language understanding 164 to boost the performance of natural language understanding 164. In cases where resolver large language model 602 is included, the rephrased natural language text 698 includes resolved ambiguities and internal questions in natural language text 630, and alleviates the burden of having to deal with the ambiguities and internal questions in natural language text 630 from natural language understanding 164. Design and performance constraints on natural language understanding 164 can be relaxed. In some cases, the implementation of dialogue state tracking 166 of FIG. 6 can be easier than dialogue state tracking 166 of FIG. 3 because dialogue state tracking 166 of FIG. 6 does not need to deal with or have pre-existing knowledge about the structured data having intents and entities (e.g., available of intents and entities, the format, etc.).

Figure 7:
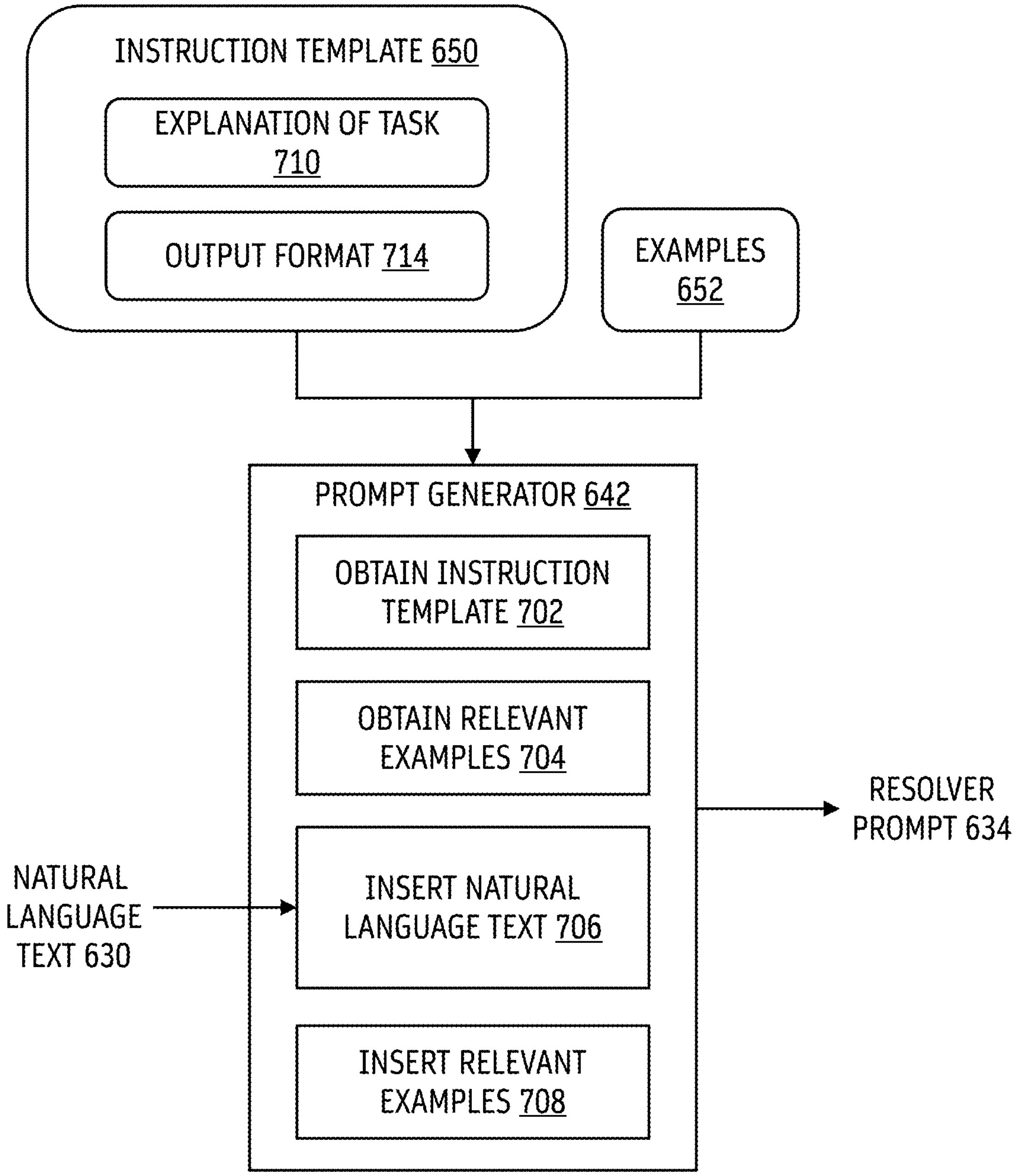
FIG. 7 illustrates a resolver prompt generator, according to some embodiments of the disclosure.

FIG. 7 illustrates resolver prompt generator 642, according to some embodiments of the disclosure. Prompt generator 642 may include obtain instruction template 702, obtain relevant examples 704, insert natural language text 706, and insert relevant examples 708. Prompt generator 642 may generate resolver prompt 634.

Obtain instruction template 702 may retrieve resolver instruction template 650. Resolver instruction template 650 may include explanation of role and task 710, and output format 714. In some embodiments, explanation of task 710 may include steps for responding to resolver prompt 643. The steps may include: (1) determining whether the natural language text 630 includes an internal question, (2) in response to determining that the natural language text 630 includes the internal question, updating the natural language text 630 to include an answer to the internal question and outputting an updated version of natural language text 630 as the resolved natural language text 670 of FIG. 6, and (3) in response to determining that the natural language text 630 does not include the internal question, outputting the natural language text 630 as the resolved natural language text 670 (leaving natural language text 630 unchanged).

The following is an example of resolver instruction template 650:

| | Example |
|---|---|
| Explanation of task 710 | Determine if the user query has an internal question about a movie, actor, or director. If yes, resolve the question and substitute the answer back into the user query.<br>If no, leave the user query as is without making any modifications. |
| Output format 714 | Provide output using the following format:<br>""""""<br>Contains Internal Question: <either Y or N><br>Updated Query: <user query after resolving the question><br>"""""" |

In the above example, contains internal question refers to Boolean flag 648 of FIG. 6, and updated query refers to resolved natural language text 670 of FIG. 6.

Obtain relevant examples 704 may retrieve one or more resolver examples 652. In some embodiments, the one or more resolver examples 652 may be predetermined or preselected for resolver prompt 634. The one or more resolver examples 652 may include one or more example inputs to large language model 602 and one or more example outputs of large language model 602 corresponding to or expected for the one or more example inputs. An example input may include natural language text 630. An example output may include a resolved version of natural language text 630. The following is an example of the one or more resolver 652:

| Examples of one or more example inputs of one or more resolver examples 652 | Examples of one or more example outputs of one or more resolver examples 652 |
|---|---|
| show me movies with the actor who played lawyer in legal aces in Vegas | Contains Internal Question: Y<br>Updated Query: show me movies with Malika Daramola |
| show those with the guy who played doctor surprise | Contains Internal Question: Y<br>Updated Query: show those with Imani Mwanga |
| show movies by the director who directed Demon's Doorstep | Contains Internal Question: Y<br>Updated Query: show movies directed by Zaria Adeolu |
| comedy movies | Contains Internal Question: N<br>Updated Query: comedy movies |

In the above example, contains internal question refers to Boolean flag 648 of FIG. 6, and updated query refers to resolved natural language text 670 of FIG. 6.

Insert natural language text 706 may append or add natural language text 630 into a suitable location in resolver instruction template 650 obtained by obtain instruction template 702.

Insert relevant examples 708 may append or insert one or more resolver examples 652 obtained in obtain relevant examples 704 into a suitable location in resolver instruction template 650 obtained by obtain instruction template 702.

To improve performance of in-context learning of resolver large language model 602 of FIG. 6 or increase adaptability of resolver large language model 602, obtain relevant examples 704 may obtain one or more resolver examples 652 based on additional information. Obtain relevant examples 704 may determine one or more contextual factors associated with one or more of a user who made the user utterance, a user device, and time. Obtain relevant examples 704 may retrieve the one or more resolver examples 652 using the one or more contextual factors. Such examples may help resolver large language model 602 formulate outputs more accurately for the user, the user device, and time. Obtain relevant examples 704 may determine one or more semantic features associated with natural language text 630. Obtain relevant examples 704 may retrieve the one or more resolver examples 652 using the one or more semantic features. Such examples may help resolver large language model 602 formulate outputs more accurately for natural language text 630.

Figure 8:
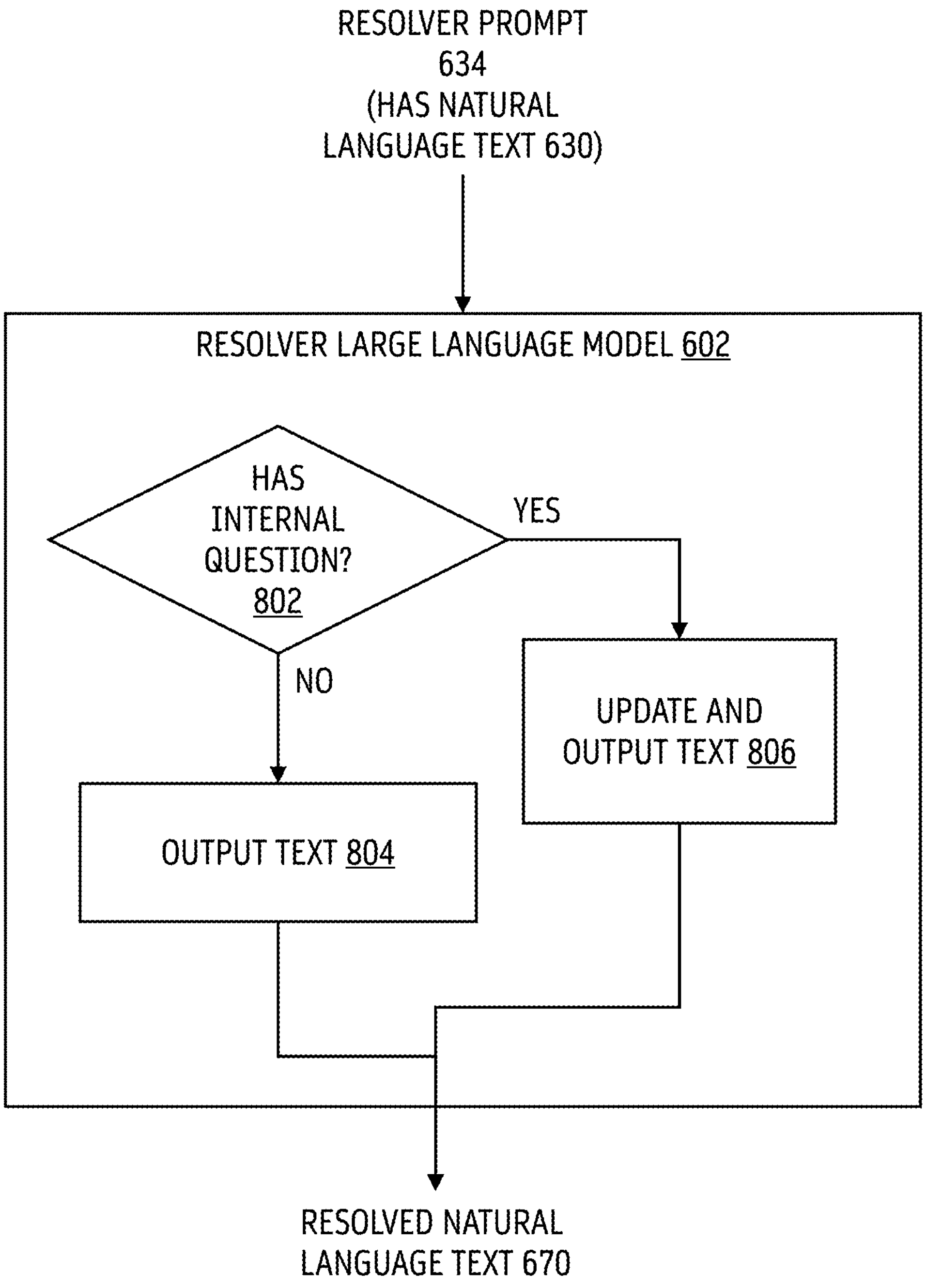
FIG. 8 illustrates hidden functionalities of a resolver large language model, according to some embodiments of the disclosure.

FIG. 8 illustrates hidden functionalities of resolver large language model 602, according to some embodiments of the disclosure. Resolver large language model 602 may receive resolver prompt 634 and generate resolved natural language text 670. Resolver large language model 602 has many components which may cooperate with each other to transform resolver prompt 634 into resolved natural language text 670. The components, when used to process resolver prompt 634, may produce resolved natural language text 670 as if these hidden functionalities were performed.

In 802, components of resolver large language model 602 may determine whether natural language text 630 has an internal question. If YES, the process proceeds to 806. If NO, the process proceeds to 804.

In 804, components of resolver large language model 602 may output natural language text 630 (unchanged) as resolved natural language text 670.

In 806, components of resolver large language model 602 may update natural language text 630 by determining an answer to the internal question and inserting the answer into natural language text 630 to produce an updated version of natural language text 630. Components of resolver large language model 602 may output the updated version of natural language text 630 as resolved natural language text 670.

Figure 9:
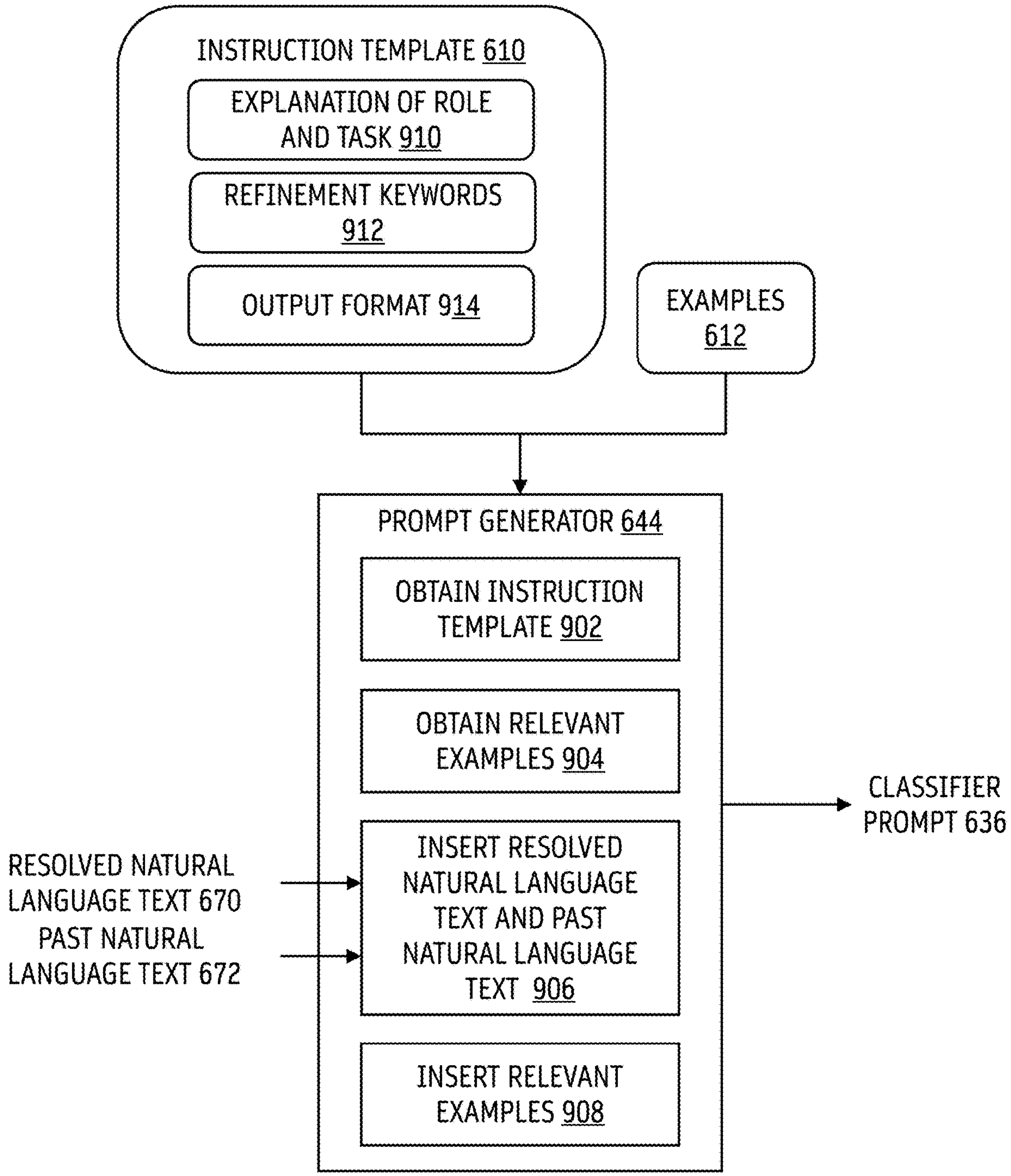
FIG. 9 illustrates a classifier prompt generator, according to some embodiments of the disclosure.

FIG. 9 illustrates classifier prompt generator 644, according to some embodiments of the disclosure. Classifier prompt generator 644 may include obtain instruction template 902, obtain relevant examples 904, insert natural language text 906, and insert relevant examples 908. Prompt generator 642 may generate classifier prompt 636.

Obtain instruction template 902 may retrieve classifier instruction template 610. Classifier instruction template 610 may include explanation of classifier role and classifier task 910, one or more refinement keywords 912, and classifier output format 914. Explanation of classifier role and classifier task 910 may include steps for responding to classifier prompt 636.

The following is an example of classifier instruction template 610:

| | Example |
|---|---|
| Explanation of classifier role and classifier task 910 | You are a conversation assistant to help users search for content on TV. You will be given the previous utterance and latest utterance of a conversation said by the user.<br>Determine if the latest utterance builds upon the previous utterance. |
| One or more refinement keywords 912 | Pay attention to keywords like "those" or pronouns like "him", "her", or "it". These keywords usually indicate user is referring to something mentioned earlier, suggesting the latest utterance builds upon the previous utterance. |
| Classifier output format 914 | Provide output using the following format:<br>“““<br>Builds Upon: <whether latest utterance builds upon previous utterance, either Y or N><br>”””<br>If the user is looking to go back, Builds Upon should be Y. If the user wants to start a new search, Builds Upon should be N. |

In the above example, builds upon refers to classifier result 638 of FIG. 6.

Obtain relevant examples 904 may retrieve one or more classifier examples 612. In some embodiments, the one or more classifier examples 612 may be predetermined or preselected for classifier prompt 636. The one or more classifier examples 612 may include one or more example inputs to classifier large language model 604 and one or more example outputs of classifier large language model 604 corresponding to or expected for the one or more example inputs. An example input may include natural language text 630. An example output may include a resolved version of natural language text 630. The following is an example of the one or more classifier examples 612:

| Examples of one or more example inputs of one or more classifier examples 612 | Examples of one or more example outputs of one or more classifier examples 612 |
|---|---|
| Previous utterance: NULL<br>Latest utterance: action movies | Builds Upon: N |
| Previous utterance: action movies<br>Latest utterance: with Elisa Moretti | Builds Upon: Y |
| Previous utterance: action movies with Elisa Moretti<br>Latest utterance: with Valentina Barerra instead | Builds Upon: Y |
| Previous utterance: action movies with Elisa Moretti<br>Latest utterance: comedy movies | Builds Upon: N |
| Previous utterance: comedies<br>Latest utterance: show those that are free | Builds Upon: Y |
| Previous utterance: show free comedies<br>Latest utterance: show fantasy movies | Builds Upon: N |
| Previous utterance: action movies<br>Latest utterance: show me movies of the actor who played the clown in The Umbrawood Curse | Builds Upon: N |
| Previous utterance: action movies with Elisa Moretti<br>Latest utterance: Priya Ahuja movies | Builds Upon: N |
| Previous utterance: sci-fi films<br>Latest utterance: by Darya Kozlova | Builds Upon: Y |
| Previous utterance: show the most popular TV Series<br>Latest utterance: which ones are available based on my subscriptions | Builds Upon: Y |
| Previous utterances: show the most popular TV Series included in my subscriptions<br>Latest utterance: show only drama ones I haven't watched | Builds Upon: Y |

In the above example, latest utterance refers to refers to natural language text 630 or resolved natural language text 670. Previous utterance refers to past natural language text 672. Builds upon refers to classifier result 638 of FIG. 6.

Insert natural language text 906 may append or add natural language text 630 (in FIG. 6) or resolved natural language text 670 into a suitable location in classifier instruction template 610 obtained by obtain instruction template 902.

Insert relevant examples 908 may append or insert one or more classifier examples 612 obtained in obtain relevant examples 904 into a suitable location in classifier instruction template 610 obtained by obtain instruction template 902.

To improve performance of in-context learning of classifier large language model 604 of FIG. 6 or increase adaptability of classifier large language model 604, obtain relevant examples 904 may obtain one or more classifier examples 612 based on additional information. Obtain relevant examples 904 may determine one or more contextual factors associated with one or more of a user who made the user utterance, a user device, and time. Obtain relevant examples 904 may retrieve the one or more classifier examples 612 using the one or more contextual factors. Such examples may help classifier large language model 604 formulate outputs more accurately for the user, the user device, and time. Obtain relevant examples 904 may determine one or more semantic features associated with one or more of natural language text 630 or resolved natural language text 670, and past natural language text 672. Obtain relevant examples 904 may retrieve the one or more classifier examples 612 using the one or more semantic features. Such examples may help classifier large language model 604 formulate outputs more accurately for natural language text 630 or resolved natural language text 670, and past natural language text 672.

Figure 10:
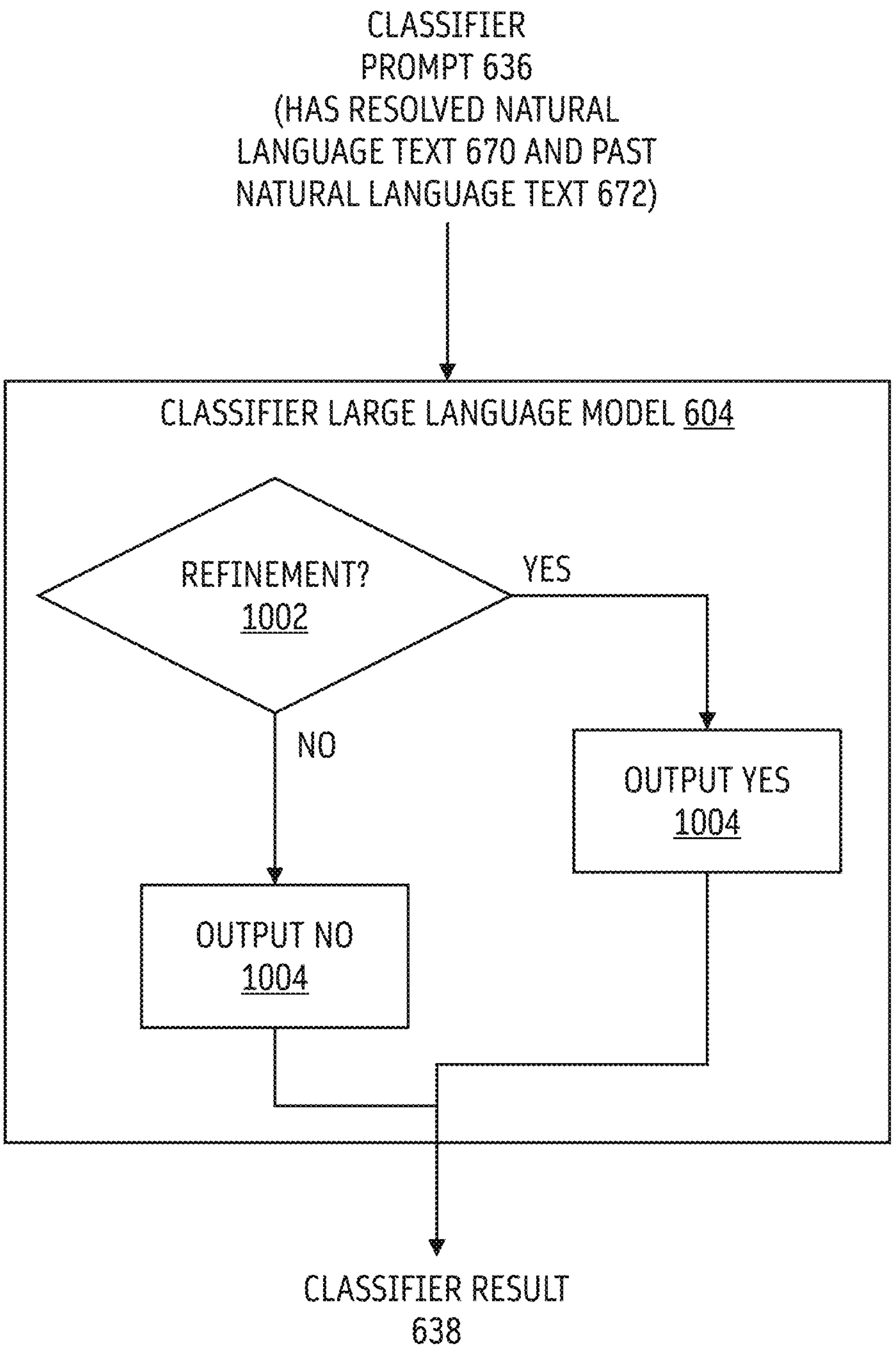
FIG. 10 illustrates hidden functionalities of a classifier large language model, according to some embodiments of the disclosure.

FIG. 10 illustrates hidden functionalities of classifier large language model 604, according to some embodiments of the disclosure. Classifier large language model 604 may receive classifier prompt 636 and generate classifier result 638. Classifier large language model 604 has many components which may cooperate with each other to transform classifier prompt 636 into classifier result 638. The components, when used to process classifier prompt 636, may produce classifier result 638 as if these hidden functionalities were performed.

In 1002, components of classifier large language model 604 may determine whether natural language text 630 or resolved natural language text 670 is a refinement of past natural language text 672. If YES, the process proceeds to 1006. If NO, the process proceeds to 1004.

In 1004, components of classifier large language model 604 may output NO as classifier result 638.

In 1006, components of classifier large language model 604 may output YES as classifier result 638.

Figure 11:
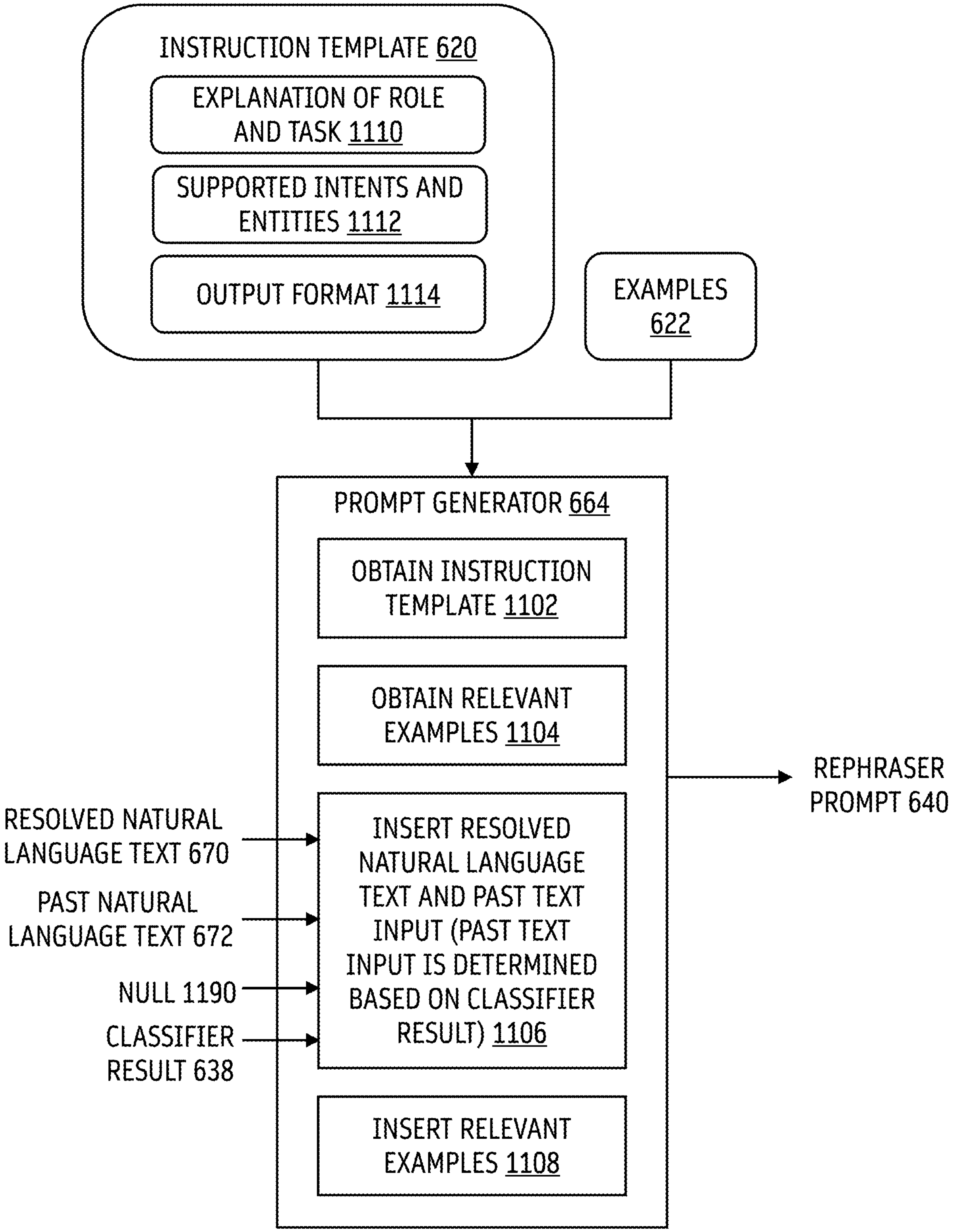
FIG. 11 illustrates a rephraser prompt generator, according to some embodiments of the disclosure.

FIG. 11 illustrates rephraser prompt generator 664, according to some embodiments of the disclosure. Rephraser prompt generator 664 may include obtain instruction template 1102, obtain relevant examples 1104, insert resolved natural language text and past text input 1106, and insert relevant examples 1108. Prompt generator 642 may generate classifier prompt 636.

Obtain instruction template 1102 may retrieve rephraser instruction template 620. Rephraser instruction template 620 may include explanation of rephraser role and rephraser task 1110, one or more supported intents in supported intents and entities 1112, one or more supported entities in supported intents and entities 1112, and rephraser output format 1114. Explanation of rephraser role and rephraser task 1110 may include steps for responding to rephraser prompt 640.

The following is an example of rephraser instruction template 620:

| | Example |
|---|---|
| Explanation of rephraser role and rephraser task 1110 | You are a conversation assistant to help users search for content on TV. You will be given the previous utterance and latest utterance of a conversation said by the user. Your task is to update the previous utterance with the latest utterance and rephrase into a simple query the natural language understanding system can easily parse. Be as concise as possible. |
| Supported intents and entities 1112 | Here is the list of supported entity types for<br>the natural language understanding system (with examples):<br>video_title: “Cyclone Protocol”, “Faeblood Legacy”, “Midlife Renegades”, etc.<br>video_franchise: “Primal Fury”, “Chronos Paradox”, etc.<br>video_character: “Gia Phelps”, etc.<br>video_genre: “action”, “comedy”, “sci-fi”, “family-friendly”, “kids”, “romance”, “fantasy”, etc.<br>video_content_type: “movies”, “tv shows”, etc.<br>actor: “Sultan Ghafari”, etc.<br>movie_director: “Kamila Sidibe”, etc.<br>action: “play”, “watch”, “find”, “show”<br>episode_number<br>season_number<br>modifier: “best”<br>price: “free”<br>music_track: “Dunes of Time”, “Mesa Sunset”, etc.<br>music_album: “Desert Memoirs”, etc.<br>music_artist: “The Nomadic Souls”, etc. |

-continued

| | Example |
|---|---|
| Rephraser output format 1114 | Provide output using the following format:<br>““““<br>Rephrased: <rephrased query><br>””””<br>If the user is looking to go back, simply rephrase as “go back to previous page”. If the user wants to start a new search, simply rephrase as “new search”. |

In the above example, rephrased refers to rephrased natural language text 698 of FIG. 6. For simplicity, supported intents intent is omitted from the examples above. It is envisioned that supported intents may be included in the rephraser instruction template 620.

Obtain relevant examples 1104 may retrieve one or more rephraser examples 622. In some embodiments, the one or more rephraser examples 622 may be predetermined or preselected for rephraser prompt 640. The one or more rephraser examples 622 may include one or more example inputs to resolver large language model 606 and one or more example outputs of resolver large language model 606 corresponding to or expected for the one or more example inputs. An example input may include natural language text 630 or resolved natural language text 670 and past text input (e.g., past natural language text 672 or NULL 1190). An example output may include rephrased natural language text 698. The following is an example of the one or more examples 312:

| Examples of one or more example inputs of one or more rephraser examples 622 | Examples of one or more example outputs of one or more rephraser examples 622 |
|---|---|
| Previous utterance: NULL<br>Latest utterance: with Elisa Moretti | Rephrased: action movies |
| Previous utterance: action movies<br>Latest utterance: with Elisa Moretti | Rephrased: action movies with Elisa Moretti |
| Previous utterance: action movies with Elisa Moretti<br>Latest utterance: with Valentina Barerra | Rephrased: action movies with Valentina Barerra |
| Previous utterance: action movies with Elisa Moretti<br>Latest utterance: with Valentina Barerra | Rephrased: action movies with Elisa Moretti and Valentina Barerra |
| Previous utterance: NULL<br>Latest utterance: show comedies to watch with my 7-year-old | Rephrased: show kids comedies |
| Previous utterance: show comedies<br>Latest utterance: show those that are free | Rephrased: show free comedies |
| Previous utterance: show comedies<br>Latest utterance: show those that were released in the last 10 years | Rephrased: show comedies released in the last 10 years |
| Previous utterances: sci-fi films<br>Latest utterance: by Thalia Quintero | Rephrased: show sci-fi films directed by Thalia Quintero |
| Previous utterance: show the most popular TV series<br>Latest utterance: which ones are available based on my subscriptions | Rephrased: show the most popular TV series included in my subscriptions |

In the above example, latest utterance refers to refers to natural language text 630 or resolved natural language text 670. Previous utterance refers to past text input (e.g., natural language text 672 or NULL 1190). Rephrased refers to rephrased natural language text 698 of FIG. 6.

Insert resolved natural language text and past text input 1106 may append or add natural language text 630 or resolved natural language text 670 into a suitable location in rephraser instruction template 620 obtained by obtain instruction template 1102. Insert resolved natural language text and past text input 1106 may append or add natural language text 630 or past text input into a suitable location in rephraser instruction template 620 obtained by obtain instruction template 1102. Insert resolved natural language text and past text input 1106 can use the past natural language text 672 as the past text input, in response to the classifier result 638 indicating natural language text 630 or resolved natural language text 670 builds upon the task associated with the past natural language text 672. Insert resolved natural language text and past text input 1106 can use NULL 1190 as the past text input, in response to the classifier result 638 indicating natural language text 630 or resolved natural language text 670 starts a new task that is different from the task.

Insert relevant examples 1108 may append or insert one or more rephraser examples 622 obtained in obtain relevant examples 1104 into a suitable location in rephraser instruction template 620 obtained by obtain instruction template 1102.

To improve performance of in-context learning of rephraser large language model 606 of FIG. 6 or increase adaptability of rephraser large language model 606, obtain relevant examples 1104 may obtain one or more rephraser examples 622 based on additional information. Obtain relevant examples 1104 may determine one or more contextual factors associated with one or more of a user who made the user utterance, a user device, and time. Obtain relevant examples 1104 may retrieve the one or more rephraser examples 622 using the one or more contextual factors. Such examples may help rephraser large language model 606 formulate outputs more accurately for the user, the user device, and time. Obtain relevant examples 1104 may determine one or more semantic features associated with one or more of natural language text 630 or resolved natural language text 670, and the past text input (e.g., past natural language text 672 or NULL 1190). Obtain relevant examples 1104 may retrieve the one or more rephraser examples 622 using the one or more semantic features. Such examples may help rephraser large language model 606 formulate outputs more accurately for natural language text 630 or resolved natural language text 670, and the past text input (e.g., past natural language text 672 or NULL 1190).

Figure 12:
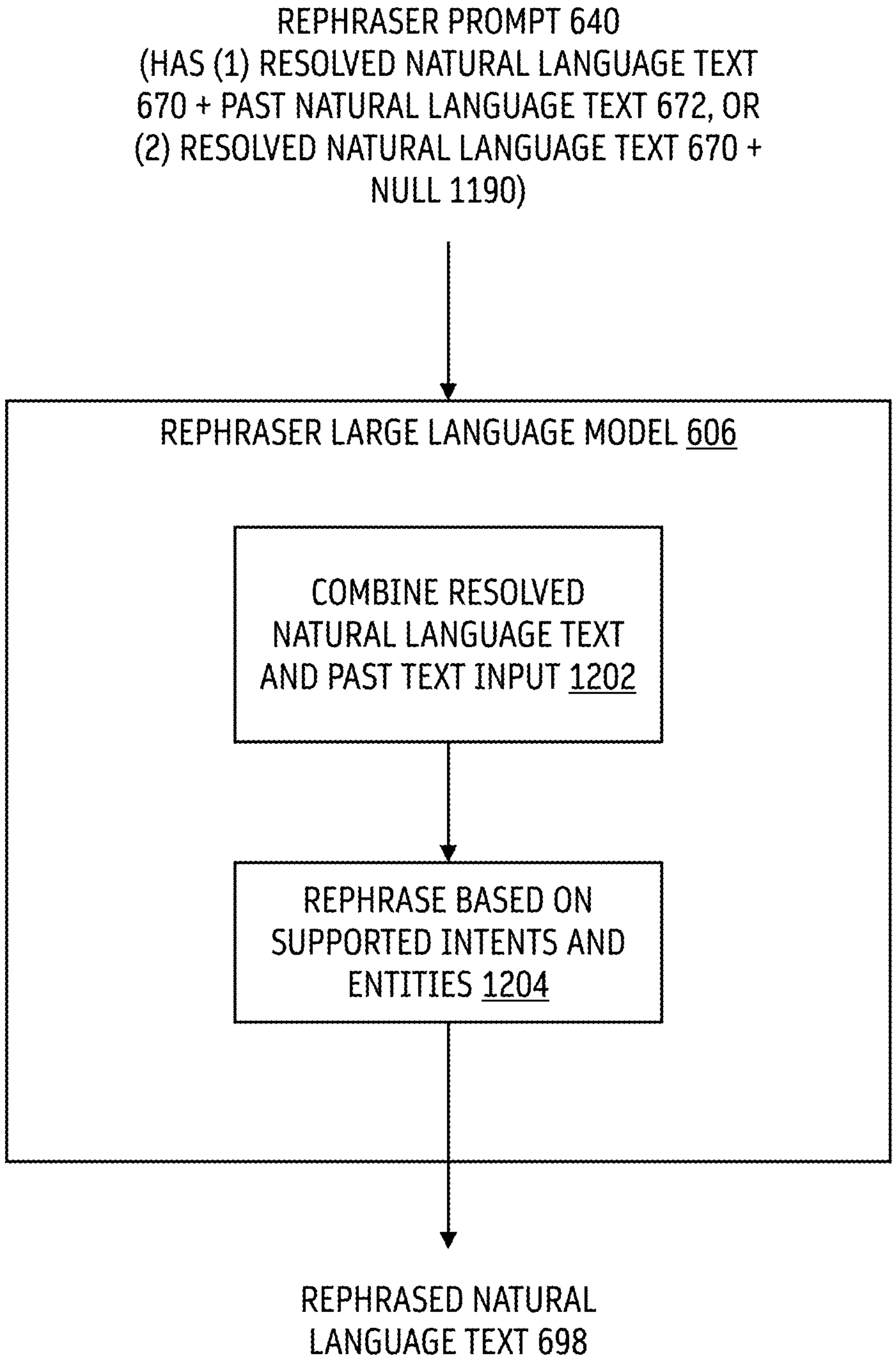
FIG. 12 illustrates hidden functionalities of a rephraser large language model, according to some embodiments of the disclosure.

FIG. 12 illustrates hidden functionalities of rephraser large language model 606, according to some embodiments of the disclosure. Rephraser large language model 606 may receive rephraser prompt 640 and generate rephrased natural language text 698. Rephraser large language model 606 has many components which may cooperate with each other to transform rephraser prompt 640 into rephrased natural language text 698. The components, when used to process rephraser prompt 640, may produce rephrased natural language text 698 as if these hidden functionalities were performed.

In 1202, components of rephraser large language model 606 may update the past text input with natural language text 630 or resolved natural language text 670 (whichever is included in rephraser prompt 640 for a given embodiment). Components of rephraser large language model 606 may combine natural language text 630 or resolved natural language text 670 and past text input (e.g., past natural language text 672 or NULL).

In 1204, components of rephraser large language model 606 may rephrase the combined result from 1202 using wording associated with supported intents and entities 1112 to produce rephrased natural language text 698.

Exemplary Methods for Dialogue State Tracking

Figure 13:
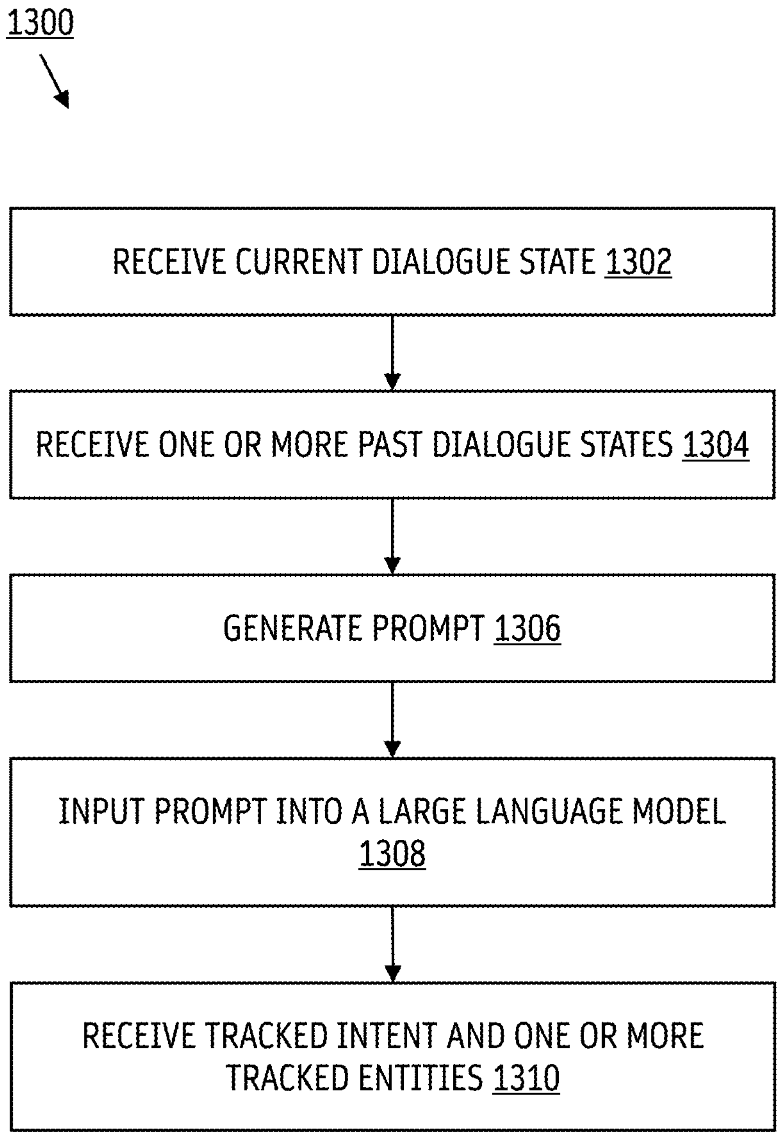
FIG. 13 is a flow chart illustrating a method for dialogue state tracking, according to some embodiments of the disclosure.

FIG. 13 is a flow chart illustrating method 1300 for dialogue state tracking, according to some embodiments of the disclosure. Method 1300 may be performed by dialogue state tracking 166, such as dialogue state tracking 166 illustrated in FIG. 3. Some parts of method 1300 may be performed by components illustrated in FIG. 1, such as components in voice assistant 160 and components in content item retrieval system 100.

In 1302, a current dialogue state may be received. The current dialogue state may include natural language text produced by an automatic speech recognition system, an intent, and one or more entities associated with the intent. The intent and the one or more entities are extracted by a natural language understanding system from the natural language text.

In 1304, one or more past dialogue states may be received from a past dialogue states manager. A past dialogue state comprises a past natural language text, a past intent, and one or more past entities associated with the past intent. The past intent and the one or more past entities are extracted by the natural language understanding system from the past natural language text.

In 1306, a prompt generator may generate a prompt. The prompt can include the current dialogue state, the one or more past dialogue states, an instruction template, and one or more examples.

In 1308, the prompt may be input into a large language model.

In 1310, a tracked intent and one or more tracked entities generated by the large language model may be received in response to the prompt.

Figure 14:
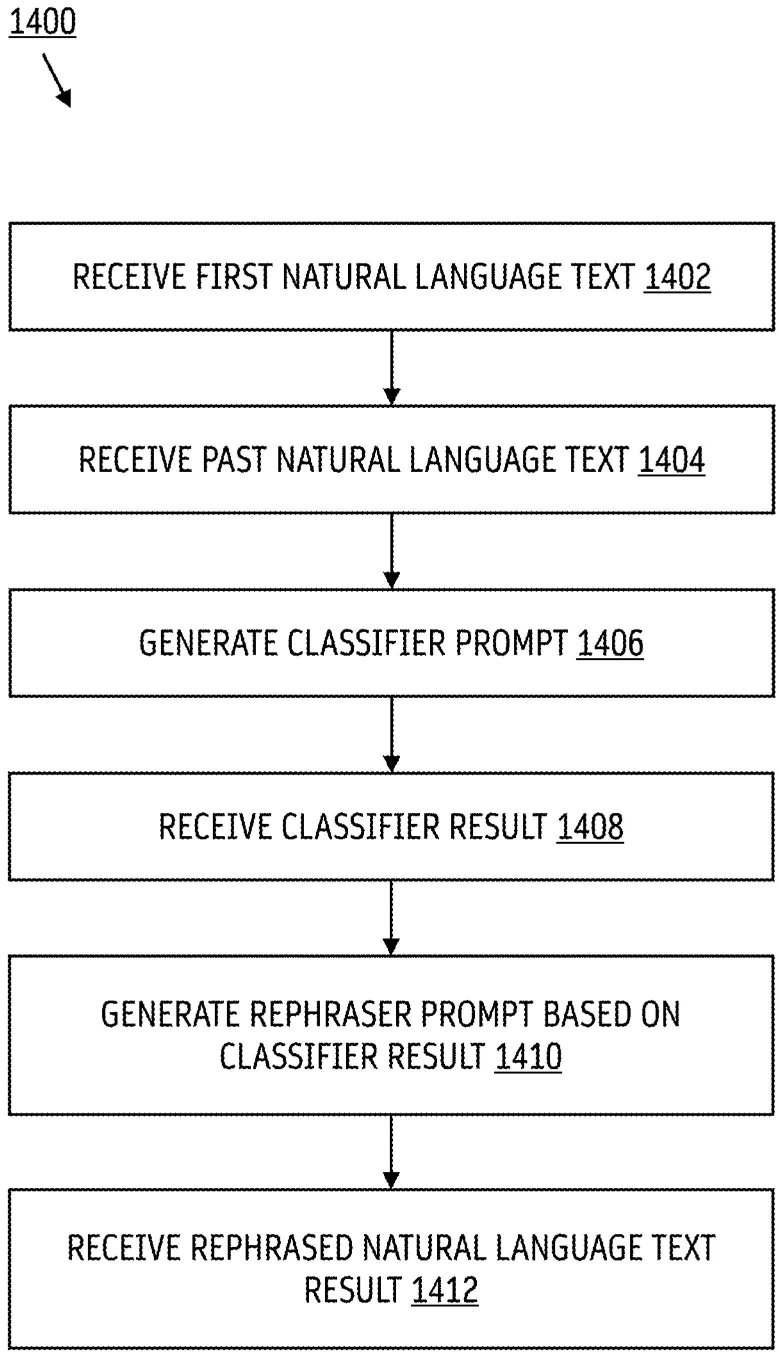
FIG. 14 is a flow chart illustrating a method for dialogue state tracking, according to some embodiments of the disclosure.

FIG. 14 is a flow chart illustrating a method for dialogue state tracking, according to some embodiments of the disclosure. Method 1400 may be performed by dialogue state tracking 166, such as dialogue state tracking 166 illustrated in FIG. 6. Some parts of method 1400 may be performed by components illustrated in FIG. 1, such as components in voice assistant 160 and components in content item retrieval system 100.

In 1402, a first natural language text representing a first user utterance may be received. The first natural language text may refer to the natural language text produced by an automatic speech recognition system. The first natural language text may refer to resolved natural language text produced by a resolver large language model.

In 1404, a past natural language text representing one or more past user utterances belonging to a task may be received from a past dialogue state manager.

In 1406, a classifier prompt generator may generate a classifier prompt. The classifier prompt can include the first natural language text, the past natural language text, a classifier instruction template, and one or more classifier examples.

In some embodiments, method 1400 may further include inputting the classifier prompt generated in 1406 into a (classifier) large language model.

In 1408, a classifier result generated by a classifier large language model in response to the classifier prompt may be received. The classifier result can indicate whether the first natural language text builds upon the task associated with the past natural language text.

In 1410, a rephraser prompt generator may generate a rephraser prompt based on the classifier result. The rephraser prompt can include the first natural language text, a past text input, a rephraser instruction template, and one or more rephraser examples. The past text input may depend on the classifier result.

In some embodiments, method 1400 may further include inputting the rephraser prompt generated in 1410 into a (rephraser) large language model.

In 1412, a rephrased natural language text generated by a rephraser large language model in response to the rephraser prompt may be received. The rephrased natural language text can combine the first natural language text and the past text input.

In some embodiments, method 1400 may further include providing the rephrased natural language text to a natural language understanding part.

In some embodiments, method 1400 may further include receiving a tracked intent and optionally one or more tracked entities produced by the natural language understanding part.

In some embodiments, method 1400 may further include using the tracked intent and the one or more tracked entities by a content item retrieval system to obtain results for a user.

Exemplary Computing Device

Figure 15:
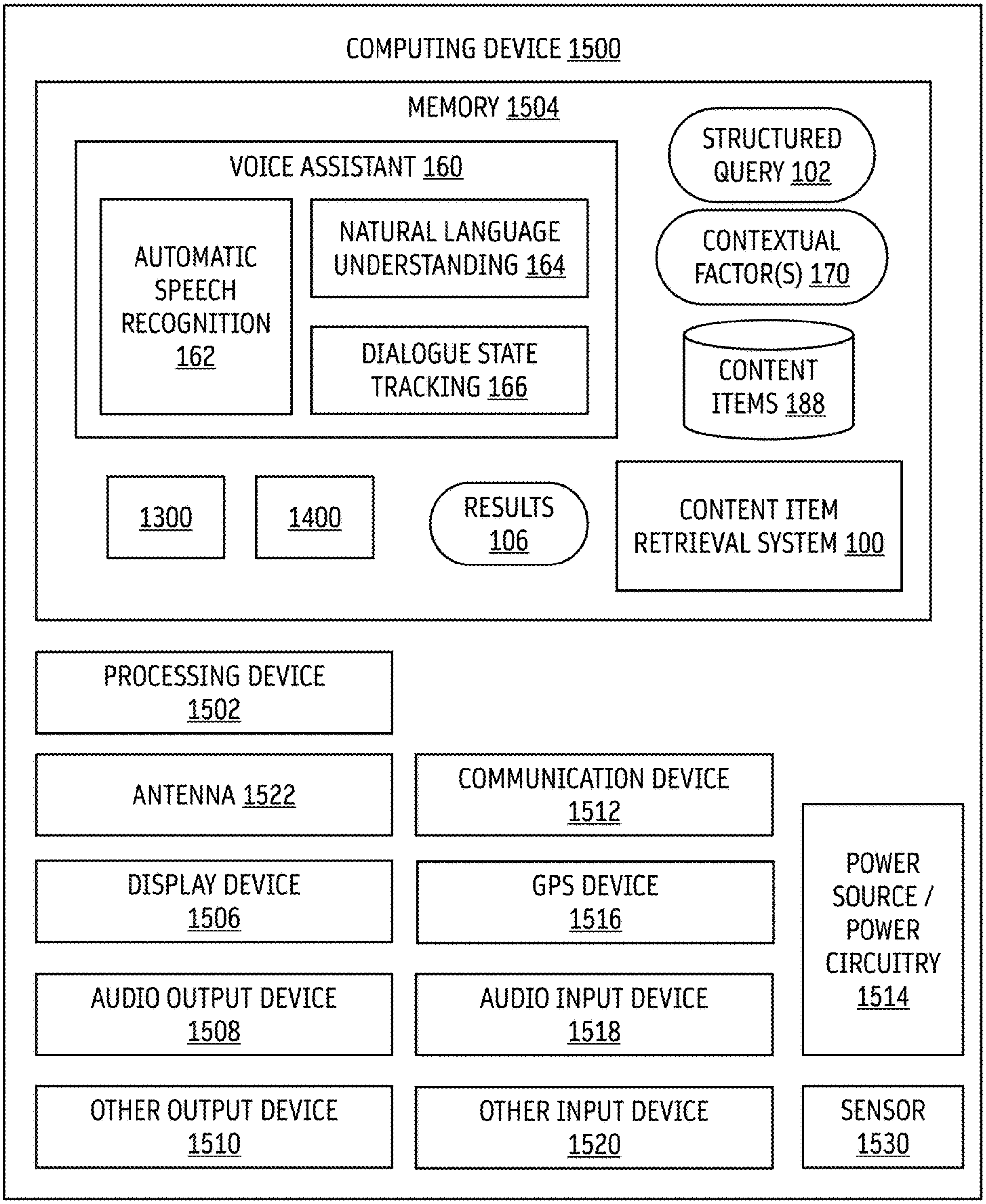
FIG. 15 is a block diagram of an exemplary computing device, according to some embodiments of the disclosure.

FIG. 15 is a block diagram of an exemplary computing device 1500, according to some embodiments of the disclosure. One or more computing devices 1500 may be used to implement the functionalities described with the FIGS. and herein. A number of components are illustrated in the FIGS. as included in the computing device 1500, but any one or more of these components may be omitted or duplicated, as suitable for the application. In some embodiments, some or all of the components included in the computing device 1500 may be attached to one or more motherboards. In some embodiments, some or all of these components are fabricated onto a single system on a chip (SoC) die. Additionally, in various embodiments, the computing device 1500 may not include one or more of the components illustrated in FIG. 15, and the computing device 1500 may include interface circuitry for coupling to the one or more components. For example, the computing device 1500 may not include a display device 1506, and may include display device interface circuitry (e.g., a connector and driver circuitry) to which a display device 1506 may be coupled. In another set of examples, the computing device 1500 may not include an audio input device 1518 or an audio output device 1508 and may include audio input or output device interface circuitry (e.g., connectors and supporting circuitry) to which an audio input device 1518 or audio output device 1508 may be coupled.

The computing device 1500 may include a processing device 1502 (e.g., one or more processing devices, one or more of the same type of processing device, one or more of different types of processing device). The processing device 1502 may include electronic circuitry that process electronic data from data storage elements (e.g., registers, memory, resistors, capacitors, quantum bit cells) to transform that electronic data into other electronic data that may be stored in registers and/or memory. Examples of processing device 1502 may include a central processing unit (CPU), a graphical processing unit (GPU), a quantum processor, a machine learning processor, an artificial intelligence processor, a neural network processor, an artificial intelligence accelerator, an application specific integrated circuit (ASIC), an analog signal processor, an analog computer, a microprocessor, a digital signal processor, a field programmable gate array (FPGA), a tensor processing unit (TPU), a data processing unit (DPU), etc.

The computing device 1500 may include a memory 1504, which may itself include one or more memory devices such as volatile memory (e.g., DRAM), nonvolatile memory (e.g., read-only memory (ROM)), high bandwidth memory (HBM), flash memory, solid state memory, and/or a hard drive. Memory 1504 includes one or more non-transitory computer-readable storage media. In some embodiments, memory 1504 may include memory that shares a die with the processing device 1502.

In some embodiments, memory 1504 includes one or more non-transitory computer-readable media storing instructions executable to perform operations described with the FIGS. and herein, such as the methods illustrated in FIGS. 1-14, including method 1300 and method 1400.

Memory 1504 may store instructions that encode one or more exemplary parts. Exemplary parts that may be encoded as instructions and stored in memory 1504 are depicted. Exemplary parts may include one or more components of voice assistant 160 of FIG. 1. Exemplary parts may include one or more components of content item retrieval system 100 of FIG. 1. Exemplary parts may include one or more components of dialogue state tracking 166 illustrated in FIGS. 3 and 6. The instructions stored in the one or more non-transitory computer-readable media may be executed by processing device 1502.

In some embodiments, memory 1504 may store data, e.g., data structures, binary data, bits, metadata, files, blobs, etc., as described with the FIGS. and herein. Exemplary data that may be stored in memory 1504 are depicted. Exemplary data may include structured query 102, one or more contextual factors 170, content items 188, and results 106. Other types of data that may be stored in memory 1504 may include instruction templates and examples described and illustrated in FIGS. 3, 4, 6, 7, 9, 11. Memory 1504 may be used by past dialogue states manager 306 to store one or more past entries (reflecting the latest dialogue state) having past natural language text and corresponding past intent and past entities. Memory 1504 may be used by past dialogue state manager 668 to store rephrased natural language text that reflects the latest dialogue state.

In some embodiments, memory 1504 may store one or more machine learning models (and or parts thereof) that are used in one or more of content item retrieval system 100, voice assistant 160, automatic speech recognition system 162, natural language understanding 164, and dialogue state tracking 166 illustrated in FIG. 1 and other FIGS. The machine learning models may include large language models described herein. Memory 1504 may store training data for training the one or more machine learning models. Memory 1504 may store input data (e.g., input tokens), output data (e.g., output tokens), intermediate outputs, intermediate inputs of one or more machine learning models. Memory 1504 may store instructions to perform one or more operations of the machine learning model. Memory 1504 may store one or more parameters used by the machine learning model. Memory 1504 may store information that encodes how processing units of the machine learning model are connected with each other.

In some embodiments, the computing device 1500 may include a communication device 1512 (e.g., one or more communication devices). For example, the communication device 1512 may be configured for managing wired and/or wireless communications for the transfer of data to and from the computing device 1500. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not. The communication device 1512 may implement any of a number of wireless standards or protocols, including but not limited to Institute for Electrical and Electronic Engineers (IEEE) standards including Wi-Fi (IEEE 802.10 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for worldwide interoperability for microwave access, which is a certification mark for products that pass conformity and interoperability tests for the IEEE 802.16 standards. The communication device 1512 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication device 1512 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication device 1512 may operate in accordance with Code-division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication device 1512 may operate in accordance with other wireless protocols in other embodiments. The computing device 1500 may include an antenna 1522 to facilitate wireless communications and/or to receive other wireless communications (such as radio frequency transmissions). The computing device 1500 may include receiver circuits and/or transmitter circuits. In some embodiments, the communication device 1512 may manage wired communications, such as electrical, optical, or any other suitable communication protocols (e.g., the Ethernet). As noted above, the communication device 1512 may include multiple communication chips. For instance, a first communication device 1512 may be dedicated to shorter-range wireless communications such as Wi-Fi or Bluetooth, and a second communication device 1512 may be dedicated to longer-range wireless communications such as global positioning system (GPS), EDGE, GPRS, CDMA, WiMAX, LTE, EV-DO, or others. In some embodiments, a first communication device 1512 may be dedicated to wireless communications, and a second communication device 1512 may be dedicated to wired communications.

The computing device 1500 may include power source/power circuitry 1514. The power source/power circuitry 1514 may include one or more energy storage devices (e.g., batteries or capacitors) and/or circuitry for coupling components of the computing device 1500 to an energy source separate from the computing device 1500 (e.g., DC power, AC power, etc.).

The computing device 1500 may include a display device 1506 (or corresponding interface circuitry, as discussed above). The display device 1506 may include any visual indicators, such as a heads-up display, a computer monitor, a projector, a touchscreen display, a liquid crystal display (LCD), a light-emitting diode display, or a flat panel display, for example.

The computing device 1500 may include an audio output device 1508 (or corresponding interface circuitry, as discussed above). The audio output device 1508 may include any device that generates an audible indicator, such as speakers, headsets, or earbuds, for example.

The computing device 1500 may include an audio input device 1518 (or corresponding interface circuitry, as discussed above). The audio input device 1518 may include any device that generates a signal representative of a sound, such as microphones, microphone arrays, or digital instruments (e.g., instruments having a musical instrument digital interface (MIDI) output).

The computing device 1500 may include a GPS device 1516 (or corresponding interface circuitry, as discussed above). The GPS device 1516 may be in communication with a satellite-based system and may receive a location of the computing device 1500, as known in the art.

The computing device 1500 may include a sensor 1530 (or one or more sensors). The computing device 1500 may include corresponding interface circuitry, as discussed above). Sensor 1530 may sense physical phenomenon and translate the physical phenomenon into electrical signals that can be processed by, e.g., processing device 1502. Examples of sensor 1530 may include: capacitive sensor, inductive sensor, resistive sensor, electromagnetic field sensor, light sensor, camera, imager, microphone, pressure sensor, temperature sensor, vibrational sensor, accelerometer, gyroscope, strain sensor, moisture sensor, humidity sensor, distance sensor, range sensor, time-of-flight sensor, pH sensor, particle sensor, air quality sensor, chemical sensor, gas sensor, biosensor, ultrasound sensor, a scanner, etc.

The computing device 1500 may include another output device 1510 (or corresponding interface circuitry, as discussed above). Examples of the other output device 1510 may include an audio codec, a video codec, a printer, a wired or wireless transmitter for providing information to other devices, haptic output device, gas output device, vibrational output device, lighting output device, home automation controller, or an additional storage device.

The computing device 1500 may include another input device 1520 (or corresponding interface circuitry, as discussed above). Examples of the other input device 1520 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The computing device 1500 may have any desired form factor, such as a handheld or mobile computer system (e.g., a cell phone, a smart phone, a mobile internet device, a music player, a tablet computer, a laptop computer, a netbook computer, a personal digital assistant (PDA), an ultramobile personal computer, a remote control, wearable device, headgear, eyewear, footwear, electronic clothing, etc.), a desktop computer system, a server or other networked computing component, a printer, a scanner, a monitor, a set-top box, an entertainment control unit, a vehicle control unit, a digital camera, a digital video recorder, an Internet-of-Things device (e.g., light bulb, cable, power plug, power source, lighting system, audio assistant, audio speaker, smart home device, smart thermostat, camera monitor device, sensor device, smart home doorbell, motion sensor device), a virtual reality system, an augmented reality system, a mixed reality system, or a wearable computer system. In some embodiments, the computing device 1500 may be any other electronic device that processes data.

SELECT EXAMPLES

Example 1 provides a method, including receiving a current dialogue state, including natural language text produced by an automatic speech recognition system, an intent, and one or more entities associated with the intent, where the intent and the one or more entities are extracted by a natural language understanding system from the natural language text; receiving one or more past dialogue states from a past dialogue states manager, where a past dialogue state includes a past natural language text, a past intent, and one or more past entities associated with the past intent, where the past intent and the one or more past entities are extracted by the natural language understanding system from the past natural language text; generating, by a prompt generator, a prompt, where the prompt includes the current dialogue state, the one or more past dialogue states, an instruction template, and one or more examples; inputting the prompt into a large language model; and receiving a tracked intent and one or more tracked entities generated by the large language model in response to the prompt.

Example 2 provides the method of example 1, further including storing in the past dialogue states manager the natural language text, the intent, and the one or more entities as an entry in the past dialogue states manager.

Example 3 provides the method of example 2, where the past dialogue states manager stores up to a maximum number of entries.

Example 4 provides the method of example 2 or 3, further including receiving, by the past dialogue states manager, a Boolean flag from the large language model indicating whether the natural language text, the intent, and the one or more entities is a start of a new task; and clearing, by the past dialogue states manager, any entries in the past dialogue states manager prior to the entry, in response to the Boolean flag indicating that the natural language text, the intent, and the one or more entities represent the start of the new task.

Example 5 provides the method of any one of examples 1-4, where generating the prompt includes obtaining the instruction template; obtaining the one or more examples; inserting the current dialogue state and the one or more past dialogue states into the instruction template; and inserting the one or more examples into the instruction template.

Example 6 provides the method of any one of examples 1-5, where the instruction template includes an explanation of role and task, steps for responding to the prompt, and output format.

Example 7 provides the method of example 6, where the steps for responding to the prompt includes (1) summarizing the current dialogue state; (2) summarizing the one or more past dialogue states; and (3) determining whether a summary of the current dialogue state is a refinement of the summary of the one or more past dialogue states.

Example 8 provides the method of example 7, where the steps for responding to the prompt includes (4) in response to determining that the summary of the current dialogue state is not the refinement of the summary of the one or more past dialogue states, outputting the intent and the one or more entities in the current dialogue state as the tracked intent and the one or more tracked entities.

Example 9 provides the method of example 7 or 8, where the steps for responding to the prompt includes (5) in response to determining that the summary of the current dialogue state is the refinement of the summary of the one or more past dialogue states, updating the tracked intent and the one or more tracked entities based on the intent and the one or more entities in the current dialogue state and the past intent and the one or more past entities in the past dialogue state, and outputting the tracked intent and the one or more tracked entities.

Example 10 provides the method of any one of examples 5-9, where obtaining the one or more examples includes determining one or more contextual factors associated with one or more of a user, a user device, and time; and retrieving the one or more examples using the one or more contextual factors.

Example 11 provides the method of any one of examples 5-10, where obtaining the one or more examples includes determining one or more semantic features associated with one or more of: the current dialogue state and the one or more past dialogue states; and retrieving the one or more examples using the one or more semantic features.

Example 12 provides the method of any one of examples 1-11, further including receiving an audio signal produced by an audio capturing system in response to a user making an utterance; and processing the audio signal by the automatic speech recognition system to produce the natural language text.

Example 13 provides the method of any one of examples 1-12, further including processing the natural language text by the natural language understanding system to produce the intent and the one or more entities.

Example 14 provides the method of any one of examples 1-13, further including translating the tracked intent and the one or more tracked entities into a search query; inputting the search query in a content item retrieval system; and outputting one or more results produced by the content item retrieval system in response to the search query to a user.

Example 15 provides one or more non-transitory computer-readable media storing instructions that, when executed by one or more processors, cause the one or more processors to: receive a current dialogue state, including natural language text produced by an automatic speech recognition system, an intent, and one or more entities associated with the intent, where the intent and the one or more entities are extracted by a natural language understanding system from the natural language text; receive one or more past dialogue states from a past dialogue states manager, where a past dialogue state includes a past natural language text, a past intent, and one or more past entities associated with the past intent, where the past intent and the one or more past entities are extracted by the natural language understanding system from the past natural language text; generate, by a prompt generator, a prompt, where the prompt includes the current dialogue state, the one or more past dialogue states, an instruction template, and one or more examples; input the prompt into a large language model; and receive a tracked intent and one or more tracked entities generated by the large language model in response to the prompt.

Example 16 provides the one or more non-transitory computer-readable media of example 15, where the instructions further cause the one or more processors to: store in the past dialogue states manager the natural language text, the intent, and the one or more entities as an entry in the past dialogue states manager.

Example 17 provides the one or more non-transitory computer-readable media of example 16, where the past dialogue states manager stores up to a maximum number of entries.

Example 18 provides the one or more non-transitory computer-readable media of example 16 or 17, where the instructions further cause the one or more processors to: receive, by the past dialogue states manager, a Boolean flag from the large language model indicating whether the natural language text, the intent, and the one or more entities represent a start of a new task; and clear, by the past dialogue states manager, any entries in the past dialogue states manager prior to the entry, in response to the Boolean flag indicating that the natural language text, the intent, and the one or more entities is the start of the new task.

Example 19 provides the one or more non-transitory computer-readable media of any one of examples 15-18, where generating the prompt includes obtaining the instruction template; obtaining the one or more examples; inserting the current dialogue state and the one or more past dialogue states into the instruction template; and inserting the one or more examples into the instruction template.

Example 20 provides the one or more non-transitory computer-readable media of any one of examples 15-19, where the instruction template includes an explanation of role and task, steps for responding to the prompt, and output format.

Example 21 provides the one or more non-transitory computer-readable media of example 20, where the steps for responding to the prompt includes (1) summarizing the current dialogue state; (2) summarizing the one or more past dialogue states; and (3) determining whether a summary of the current dialogue state is a refinement of the summary of the one or more past dialogue states.

Example 22 provides the one or more non-transitory computer-readable media of example 21, where the steps for responding to the prompt includes (4) in response to determining that the summary of the current dialogue state is not the refinement of the summary of the one or more past dialogue states, outputting the intent and the one or more entities in the current dialogue state as the tracked intent and the one or more tracked entities.

Example 23 provides the one or more non-transitory computer-readable media of example 21 or 22, where the steps for responding to the prompt includes (5) in response to determining that the summary of the current dialogue state is the refinement of the summary of the one or more past dialogue states, updating the tracked intent and the one or more tracked entities based on the intent and the one or more entities in the current dialogue state and the past intent and the one or more past entities in the past dialogue state, and outputting the tracked intent and the one or more tracked entities.

Example 24 provides the one or more non-transitory computer-readable media of any one of examples 19-23, where obtaining the one or more examples includes determining one or more contextual factors associated with one or more of a user, a user device, and time; and retrieving the one or more examples using the one or more contextual factors.

Example 25 provides the one or more non-transitory computer-readable media of any one of examples 19-24, where obtaining the one or more examples includes determining one or more semantic features associated with one or more of: the current dialogue state and the one or more past dialogue states; and retrieving the one or more examples using the one or more semantic features.

Example 26 provides the one or more non-transitory computer-readable media of any one of examples 15-25, where the instructions further cause the one or more processors to: receive an audio signal produced by an audio capturing system in response to a user making an utterance; and process the audio signal by the automatic speech recognition system to produce the natural language text.

Example 27 provides the one or more non-transitory computer-readable media of any one of examples 15-26, where the instructions further cause the one or more processors to: process the natural language text by the natural language understanding system to produce the intent and the one or more entities.

Example 28 provides the one or more non-transitory computer-readable media of any one of examples 15-27, where the instructions further cause the one or more processors to: translate the tracked intent and the one or more tracked entities into a search query; input the search query in a content item retrieval system; and output one or more results produced by the content item retrieval system in response to the search query to a user.

Example 29 provides a computer implemented system, including one or more processors; and one or more non-transitory computer-readable memories to store instructions, where the instructions, when executed by the one or more processors, cause the one or more processors to perform a method according to any one of examples 1-14.

Example 30 provides a system, including an automatic speech recognition system; a natural language understanding system; and a dialogue state tracking system to perform a method according to any one of examples 1-14.

Example 31 provides a method, including receiving a first natural language text representing a first user utterance; receiving, from a past dialogue state manager, a past natural language text representing one or more past user utterances belonging to a task; generating, by a classifier prompt generator, a classifier prompt, where the classifier prompt includes the first natural language text, the past natural language text, a classifier instruction template, and one or more classifier examples; receiving a classifier result generated by a classifier large language model in response to the classifier prompt, where the classifier result indicates whether the first natural language text builds upon the task associated with the past natural language text; generating, by a rephraser prompt generator, a rephraser prompt based on the classifier result, where the rephraser prompt includes the first natural language text, a past text input, a rephraser instruction template, and one or more rephraser examples; and receiving a rephrased natural language text generated by a rephraser large language model in response to the rephraser prompt, where the rephrased natural language text combines the first natural language text and the past text input.

Example 32 provides the method of example 31, further including storing the rephrased natural language text in the past dialogue state manager.

Example 33 provides the method of example 31 or 32, further including generating, by a resolver prompt generator, a resolver prompt, where the resolver prompt includes a second natural language text produced by an automatic speech recognition system, a resolver instruction template, and one or more resolver examples; and generating, by a resolver large language model, the first natural language text in response to the resolver prompt.

Example 34 provides the method of example 33, where generating the resolver prompt includes obtaining the resolver instruction template; obtaining the one or more resolver examples; inserting the second natural language text into the resolver instruction template; and inserting the one or more resolver examples into the resolver instruction template.

Example 35 provides the method of example 33 or 34, where the resolver instruction template includes (1) determining whether the second natural language text includes an internal question; (2) in response to determining that the second natural language text includes the internal question, updating the second natural language text to include an answer to the internal question and outputting an updated version of the second natural language text as the first natural language text; and (3) in response to determining that the second natural language text does not include the internal question, outputting the second natural language text as the first natural language text.

Example 36 provides the method of example 34 or 35, where obtaining the one or more resolver examples includes determining one or more contextual factors associated with one or more of a user who made the first user utterance, a user device, and time; and retrieving the one or more resolver examples using the one or more contextual factors.

Example 37 provides the method of any one of examples 34-36, where obtaining the one or more resolver examples includes determining one or more semantic features associated with the second natural language text; and retrieving the one or more resolver examples using the one or more semantic features.

Example 38 provides the method of any one of examples 31-37, where generating the classifier prompt includes obtaining the classifier instruction template; obtaining the one or more classifier examples; inserting the first natural language text and the past natural language text into the classifier instruction template; and inserting the one or more classifier examples into the classifier instruction template.

Example 39 provides the method of any one of examples 31-38, where the classifier instruction template includes an explanation of classifier role and classifier task, one or more refinement keywords, and a classifier output format.

Example 40 provides the method of example 38 or 39, where obtaining the one or more classifier examples includes determining one or more contextual factors associated with one or more of a user who made the first user utterance, a user device, and time; and retrieving the one or more classifier examples using the one or more contextual factors.

Example 41 provides the method of any one of examples 38-40, where obtaining the one or more classifier examples includes determining one or more semantic features associated with one or more of: the first natural language text and the past natural language text; and retrieving the one or more classifier examples using the one or more semantic features.

Example 42 provides the method of any one of examples 31-41, where generating the rephraser prompt includes obtaining the rephraser instruction template; obtaining the one or more rephraser examples; inserting the first natural language text and the past text input into the rephraser instruction template; and inserting the one or more rephraser examples into the rephraser instruction template.

Example 43 provides the method of any one of examples 31-42, where the rephraser instruction template includes an explanation of rephraser role and rephraser task, one or more supported intents, one or more supported entities, and a rephraser output format.

Example 44 provides the method of example 42 or 43, where obtaining the one or more rephraser examples includes determining one or more contextual factors associated with one or more of a user who made the first user utterance, a user device, and time; and retrieving the one or more rephraser examples using the one or more contextual factors.

Example 45 provides the method of any one of examples 42-44, where obtaining the one or more rephraser examples includes determining one or more semantic features associated with one or more of: the first natural language text and the past text input; and retrieving the one or more rephraser examples using the one or more semantic features.

Example 46 provides the method of any one of examples 31-45, where generating the rephraser prompt includes using the past natural language text as the past text input, in response to the classifier result indicating the first natural language text builds upon the task associated with the past natural language text; and using NULL as the past text input, in response to the classifier result indicating the first natural language text starts a new task that is different from the task.

Example 47 provides the method of any one of examples 31-46, further including receiving an audio signal produced by an audio capturing device in response to the first user utterance being made; and processing the audio signal by an automatic speech recognition system to produce the first natural language text.

Example 48 provides the method of any one of examples 33-37, further including receiving an audio signal produced by an audio capturing device in response to the first user utterance being made; and processing the audio signal by the automatic speech recognition system to produce the second natural language text.

Example 49 provides the method of any one of examples 31-48, further including processing the rephrased natural language text by a natural language understanding system to produce a tracked intent and one or more tracked entities.

Example 50 provides the method of example 49, further including translating the tracked intent and the one or more tracked entities into a search query; inputting the search query in a content retrieval system; and outputting one or more results produced by the content retrieval system in response to the search query to a user.

Example 51 provides one or more non-transitory computer-readable media storing instructions that, when executed by one or more processors, cause the one or more processors to: receive a first natural language text representing a first user utterance; receive, from a past dialogue state manager, a past natural language text representing one or more past user utterances belonging to a task; generate, by a classifier prompt generator, a classifier prompt, where the classifier prompt includes the first natural language text, the past natural language text, a classifier instruction template, and one or more classifier examples; receive a classifier result generated by a classifier large language model in response to the classifier prompt, where the classifier result indicates whether the first natural language text builds upon the task associated with the past natural language text; generate, by a rephraser prompt generator, a rephraser prompt based on the classifier result, where the rephraser prompt includes the first natural language text, a past text input, a rephraser instruction template, and one or more rephraser examples; and receive a rephrased natural language text generated by a rephraser large language model in response to the rephraser prompt, where the rephrased natural language text combines the first natural language text and the past text input.

Example 52 provides the one or more non-transitory computer-readable media of example 51, where the instructions further cause the one or more processors to: store the rephrased natural language text in the past dialogue state manager.

Example 53 provides the one or more non-transitory computer-readable media of example 51 or 52, where the instructions further cause the one or more processors to: generate, by a resolver prompt generator, a resolver prompt, where the resolver prompt includes a second natural language text produced by an automatic speech recognition system, a resolver instruction template, and one or more resolver examples; and generating, by a resolver large language model, the first natural language text in response to the resolver prompt.

Example 54 provides the one or more non-transitory computer-readable media of example 53, where generating the resolver prompt includes obtaining the resolver instruction template; obtaining the one or more resolver examples; inserting the second natural language text into the resolver instruction template; and inserting the one or more resolver examples into the resolver instruction template.

Example 55 provides the one or more non-transitory computer-readable media of example 53 or 54, where the resolver instruction template includes (1) determining whether the second natural language text includes an internal question; (2) in response to determining that the second natural language text includes the internal question, updating the second natural language text to include an answer to the internal question and outputting an updated version of the second natural language text as the first natural language text; and (3) in response to determining that the second natural language text does not include the internal question, outputting the second natural language text as the first natural language text.

Example 56 provides the one or more non-transitory computer-readable media of example 54 or 55, where obtaining the one or more resolver examples includes determining one or more contextual factors associated with one or more of a user who made the first user utterance, a user device, and time; and retrieving the one or more resolver examples using the one or more contextual factors.

Example 57 provides the one or more non-transitory computer-readable media of any one of examples 54-56, where obtaining the one or more resolver examples includes determining one or more semantic features associated with the second natural language text; and retrieving the one or more resolver examples using the one or more semantic features.

Example 58 provides the one or more non-transitory computer-readable media of any one of examples 51-57, where generating the classifier prompt includes obtaining the classifier instruction template; obtaining the one or more classifier examples; inserting the first natural language text and the past natural language text into the classifier instruction template; and inserting the one or more classifier examples into the classifier instruction template.

Example 59 provides the one or more non-transitory computer-readable media of any one of examples 51-58, where the classifier instruction template includes an explanation of classifier role and classifier task, one or more refinement keywords, and a classifier output format.

Example 60 provides the one or more non-transitory computer-readable media of example 58 or 59, where obtaining the one or more classifier examples includes determining one or more contextual factors associated with one or more of a user who made the first user utterance, a user device, and time; and retrieving the one or more classifier examples using the one or more contextual factors.

Example 61 provides the one or more non-transitory computer-readable media of any one of examples 58-60, where obtaining the one or more classifier examples includes determining one or more semantic features associated with one or more of: the first natural language text and the past natural language text; and retrieving the one or more classifier examples using the one or more semantic features.

Example 62 provides the one or more non-transitory computer-readable media of any one of examples 51-61, where generating the rephraser prompt includes obtaining the rephraser instruction template; obtaining the one or more rephraser examples; inserting the first natural language text and the past text input into the rephraser instruction template; and inserting the one or more rephraser examples into the rephraser instruction template.

Example 63 provides the one or more non-transitory computer-readable media of any one of examples 51-62, where the rephraser instruction template includes an explanation of rephraser role and rephraser task, one or more supported intents, one or more supported entities, and a rephraser output format.

Example 64 provides the one or more non-transitory computer-readable media of example 62 or 63, where obtaining the one or more rephraser examples includes determining one or more contextual factors associated with one or more of a user who made the first user utterance, a user device, and time; and retrieving the one or more rephraser examples using the one or more contextual factors.

Example 65 provides the one or more non-transitory computer-readable media of any one of examples 62-64, where obtaining the one or more rephraser examples includes determining one or more semantic features associated with one or more of: the first natural language text and the past text input; and retrieving the one or more rephraser examples using the one or more semantic features.

Example 66 provides the one or more non-transitory computer-readable media of any one of examples 51-65, where generating the rephraser prompt includes using the past natural language text as the past text input, in response to the classifier result indicating the first natural language text builds upon the task associated with the past natural language text; and using NULL as the past text input, in response to the classifier result indicating the first natural language text starts a new task that is different from the task.

Example 67 provides the one or more non-transitory computer-readable media of any one of examples 51-66, where the instructions further cause the one or more processors to: receive an audio signal produced by an audio capturing device in response to the first user utterance being made; and process the audio signal by an automatic speech recognition system to produce the first natural language text.

Example 68 provides the one or more non-transitory computer-readable media of any one of examples 53-67, where the instructions further cause the one or more processors to: receive an audio signal produced by an audio capturing device in response to the first user utterance being made; and process the audio signal by the automatic speech recognition system to produce the second natural language text.

Example 69 provides the one or more non-transitory computer-readable media of any one of examples 51-68, where the instructions further cause the one or more processors to: process the rephrased natural language text by a natural language understanding system to produce a tracked intent and one or more tracked entities.

Example 70 provides the one or more non-transitory computer-readable media of example 69, where the instructions further cause the one or more processors to: translate the tracked intent and the one or more tracked entities into a search query; input the search query in a content retrieval system; and output one or more results produced by the content retrieval system in response to the search query to a user.

Example 71 provides a computer implemented system, including one or more processors; and one or more non-transitory computer-readable memories to store instructions, where the instructions, when executed by the one or more processors, cause the one or more processors to perform a method according to any one of examples 31-50.

Example 72 provides a system, including an automatic speech recognition system; a natural language understanding system; and a dialogue state tracking system to perform a method according to any one of examples 31-50.

Example A provides an apparatus comprising means for carrying out any one of examples 1-14 and 31-50.

Example B provides a dialogue state tracking system as illustrated in FIGS. 3-5.

Example C provides a dialogue state tracking system as illustrated in FIGS. 6-12.

VARIATIONS AND OTHER NOTES

Although the operations of the example methods shown in and described with reference to the FIGS. are illustrated as occurring once each and in a particular order, it will be recognized that the operations may be performed in any suitable order and repeated as desired. Additionally, one or more operations may be performed in parallel. Furthermore, the operations illustrated in the FIGS. may be combined or may include more or fewer details than described.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

For purposes of explanation, specific numbers, materials and configurations are set forth in order to provide a thorough understanding of the illustrative implementations. However, it will be apparent to one skilled in the art that the present disclosure may be practiced without the specific details and/or that the present disclosure may be practiced with only some of the described aspects. In other instances, well known features are omitted or simplified in order not to obscure the illustrative implementations.

Further, references are made to the accompanying drawings that form a part hereof, and in which are shown, by way of illustration, embodiments that may be practiced. It is to be understood that other embodiments may be utilized, and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the disclosed subject matter. However, the order of description should not be construed as to imply that these operations are necessarily order dependent. In particular, these operations may not be performed in the order of presentation. Operations described may be performed in a different order from the described embodiment. Various additional operations may be performed or described operations may be omitted in additional embodiments.

For the purposes of the present disclosure, the phrase "A or B" or the phrase "A and/or B" means (A), (B), or (A and B). For the purposes of the present disclosure, the phrase "A, B, or C" or the phrase "A, B, and/or C" means (A), (B), (C), (A and B), (A and C), (B and C), or (A, B, and C). The term "between," when used with reference to measurement ranges, is inclusive of the ends of the measurement ranges.

The description uses the phrases "in an embodiment" or "in embodiments," which may each refer to one or more of the same or different embodiments. The terms "comprising," "including," "having," and the like, as used with respect to embodiments of the present disclosure, are synonymous. The disclosure may use perspective-based descriptions such as "above," "below," "top," "bottom," and "side" to explain various features of the drawings, but these terms are simply for case of discussion, and do not imply a desired or required orientation. The accompanying drawings are not necessarily drawn to scale. Unless otherwise specified, the use of the ordinal adjectives "first," "second," and "third," etc., to describe a common object, merely indicates that different instances of like objects are being referred to and are not intended to imply that the objects so described must be in a given sequence, cither temporally, spatially, in ranking or in any other manner.

In the following detailed description, various aspects of the illustrative implementations will be described using terms commonly employed by those skilled in the art to convey the substance of their work to others skilled in the art.

The terms "substantially," "close," "approximately," "near," and "about," generally refer to being within +/−20% of a target value as described herein or as known in the art. Similarly, terms indicating orientation of various elements, e.g., "coplanar," "perpendicular," "orthogonal," "parallel," or any other angle between the elements, generally refer to being within +/−5-20% of a target value as described herein or as known in the art.

In addition, the terms "comprise," "comprising," "include," "including," "have," "having" or any other variation thereof, are intended to cover a non-exclusive inclusion. For example, a method, process, or device, that comprises a list of elements is not necessarily limited to only those elements but may include other elements not expressly listed or inherent to such method, process, or device. Also, the term "or" refers to an inclusive "or" and not to an exclusive "or."

The systems, methods and devices of this disclosure each have several innovative aspects, no single one of which is solely responsible for all desirable attributes disclosed herein. Details of one or more implementations of the subject matter described in this specification are set forth in the description and the accompanying drawings.

The invention claimed is:

1. A method for assisting performance of a task associated with a media player, comprising:

receiving a first natural language text representing a first user utterance;

receiving, from a past dialogue state manager, a past natural language text representing one or more past user utterances belonging to a task;

generating, by a classifier prompt generator, a classifier prompt, wherein the classifier prompt comprises the first natural language text, the past natural language text, a classifier instruction template, and one or more classifier examples;

generating a classifier result by a classifier large language model in response to the classifier prompt, wherein the classifier result indicates whether the first natural language text builds upon the task associated with the past natural language text;

generating, by a rephraser prompt generator, a rephraser prompt based on the classifier result, wherein the rephraser prompt comprises the first natural language text, a past text input, a rephraser instruction template, and one or more rephraser examples, the past text input includes the past natural language text based on the classifier result indicating the first natural language text builds upon the task associated with the past natural language text, and the past text input includes NULL based on the classifier result indicating the first natural language text does not build upon the task associated with the past natural language text;

generating a rephrased natural language text by a rephraser large language model in response to the rephraser prompt, wherein the rephrased natural language text combines the first natural language text and the past text input;

storing the rephrased natural language text in the past dialogue state manager to be used as the past natural language text to process a second user utterance following the first user utterance; and processing the rephrased natural language text by a natural language understanding system to produce a tracked intent and one or more tracked entities usable to perform the task associated with the media player.

2. The method of claim 1, further comprising:

generating, by a resolver prompt generator, a resolver prompt, wherein the resolver prompt comprises a second natural language text produced by an automatic speech recognition system, a resolver instruction template, and one or more resolver examples; and generating, by a resolver large language model, the first natural language text in response to the resolver prompt.

3. The method of claim 2, wherein generating the resolver prompt comprises:

obtaining the resolver instruction template;

obtaining the one or more resolver examples;

inserting the second natural language text into the resolver instruction template; and inserting the one or more resolver examples into the resolver instruction template.

4. The method of claim 2, wherein the resolver instruction template comprises:

(1) determining whether the second natural language text includes an internal question;

(2) in response to determining that the second natural language text includes the internal question, updating the second natural language text to include an answer to the internal question and outputting an updated version of the second natural language text as the first natural language text; and (3) in response to determining that the second natural language text does not include the internal question, outputting the second natural language text as the first natural language text.

5. The method of claim 3, wherein obtaining the one or more resolver examples comprises:

determining one or more contextual factors associated with one or more of a user who made the first user utterance, a user device, and time; and retrieving the one or more resolver examples using the one or more contextual factors.

6. The method of claim 3, wherein obtaining the one or more resolver examples comprises:

determining one or more semantic features associated with the second natural language text; and retrieving the one or more resolver examples using the one or more semantic features.

7. The method of claim 1, wherein generating the classifier prompt comprises:

obtaining the classifier instruction template;

obtaining the one or more classifier examples;

inserting the first natural language text and the past natural language text into the classifier instruction template; and inserting the one or more classifier examples into the classifier instruction template.

8. The method of claim 1, wherein the classifier instruction template comprises: an explanation of classifier role and classifier task, one or more refinement keywords, and a classifier output format.

9. The method of claim 7, wherein obtaining the one or more classifier examples comprises:

determining one or more contextual factors associated with one or more of a user who made the first user utterance, a user device, and time; and retrieving the one or more classifier examples using the one or more contextual factors.

10. The method of claim 7, wherein obtaining the one or more classifier examples comprises:

determining one or more semantic features associated with one or more of: the first natural language text and the past natural language text; and retrieving the one or more classifier examples using the one or more semantic features.

11. The method of claim 1, wherein generating the rephraser prompt comprises:

obtaining the rephraser instruction template;

obtaining the one or more rephraser examples;

inserting the first natural language text and the past text input into the rephraser instruction template; and inserting the one or more rephraser examples into the rephraser instruction template.

12. The method of claim 1, wherein the rephraser instruction template comprises: an explanation of rephraser role and rephraser task, one or more supported intents, one or more supported entities, and a rephraser output format.

13. The method of claim 11, wherein obtaining the one or more rephraser examples comprises:

determining one or more contextual factors associated with one or more of a user who made the first user utterance, a user device, and time; and retrieving the one or more rephraser examples using the one or more contextual factors.

14. The method of claim 11, wherein obtaining the one or more rephraser examples comprises:

determining one or more semantic features associated with one or more of: the first natural language text and the past text input; and retrieving the one or more rephraser examples using the one or more semantic features.

15. One or more non-transitory computer-readable media storing instructions that, when executed by one or more processors, cause the one or more processors to perform operations for assisting performance of a task associated with a media player, wherein the operations comprise:

receiving a first natural language text representing a first user utterance;

receiving, from a past dialogue state manager, a past natural language text representing one or more past user utterances belonging to a task;

generating, by a classifier prompt generator, a classifier prompt, wherein the classifier prompt comprises the first natural language text, the past natural language text, a classifier instruction template, and one or more classifier examples;

generating a classifier result generated by a classifier large language model in response to the classifier prompt, wherein the classifier result indicates whether the first natural language text builds upon the task associated with the past natural language text;

generating, by a rephraser prompt generator, a rephraser prompt based on the classifier result, wherein the rephraser prompt comprises the first natural language text, a past text input, a rephraser instruction template, and one or more rephraser examples, the past text input includes the past natural language text based on the classifier result indicating the first natural language text builds upon the task associated with the past natural language text, and the past text input includes NULL based on the classifier result indicating the first natural language text does not build upon the task associated with the past natural language text;

generating a rephrased natural language text, by a rephraser large language model, in response to the rephraser prompt, wherein the rephrased natural language text combines the first natural language text and the past text input;

storing the rephrased natural language text in the past dialogue state manager to be used as the past natural language text to process a second user utterance following the first user utterance; and processing the rephrased natural language text by a natural language understanding system to produce a tracked intent and one or more tracked entities usable to perform the task associated with the media player.

16. A system for assisting performance of a task associated with a media player, comprising:

an automatic speech recognition system;

a natural language understanding system; and a dialogue state tracking system to:

receive, from the automatic speech recognition system, a first natural language text representing a first user utterance;

receive, from a past dialogue state manager of the dialogue state tracking system, a past natural language text representing one or more past user utterances belonging to a task;

generate, by a classifier prompt generator of the dialogue state tracking system, a classifier prompt, wherein the classifier prompt comprises the first natural language text, the past natural language text, a classifier instruction template, and one or more classifier examples;

generate a classifier result generated by a classifier large language model of the dialogue state tracking system in response to the classifier prompt, wherein the classifier result indicates whether the first natural language text builds upon the task associated with the past natural language text;

generate, by a rephraser prompt generator of the dialogue state tracking system, a rephraser prompt based on the classifier result, wherein the rephraser prompt comprises the first natural language text, a past text input, a rephraser instruction template, and one or more rephraser examples, the past text input includes the past natural language text based on the classifier result indicating the first natural language text builds upon the task associated with the past natural language text, and the past text input includes NULL based on the classifier result indicating the first natural language text does not build upon the task associated with the past natural language text;

generate a rephrased natural language text generated by a rephraser large language model of the dialogue state tracking system in response to the rephraser prompt, wherein the rephrased natural language text combines the first natural language text and the past text input;

store the rephrased natural language text in the past dialogue state manager to be used as the past natural language text to process a second user utterance following the first user utterance; and process the rephrased natural language text by a natural language understanding system to produce a tracked intent and one or more tracked entities usable to perform the task associated with the media player.

17. The system of claim 16, wherein the dialogue state tracking system is further to:

generate, by a resolver prompt generator, a resolver prompt, wherein the resolver prompt comprises a second natural language text produced by an automatic speech recognition system, a resolver instruction template, and one or more resolver examples; and generate, by a resolver large language model, the first natural language text in response to the resolver prompt.

18. The system of claim 17, wherein the resolver instruction template comprises:

(1) determining whether the second natural language text includes an internal question;

(2) in response to determining that the second natural language text includes the internal question, updating the second natural language text to include an answer to the internal question and outputting an updated version of the second natural language text as the first natural language text; and (3) in response to determining that the second natural language text does not include the internal question, outputting the second natural language text as the first natural language text.

19. The system of claim 17, wherein the one or more resolver examples are obtained by:

determining one or more contextual factors associated with one or more of a user who made the first user utterance, a user device, and time; and retrieving the one or more resolver examples using the one or more contextual factors.

20. The system of claim 17, wherein the one or more resolver examples are obtained by:

determining one or more semantic features associated with one or more of: the first natural language text and the past text input; and retrieving the one or more resolver examples using the one or more semantic features.

* * * * *